US008777711B2

(12) United States Patent
Seelig et al.

(10) Patent No.: US 8,777,711 B2
(45) Date of Patent: Jul. 15, 2014

(54) GAMING DEVICE AND METHOD OF USE

(75) Inventors: Jerald C. Seelig, Absecon, NJ (US); Lawrence M. Henshaw, Hammonton, NJ (US)

(73) Assignee: IGT, Las Vegas, NV (US)

( * ) Notice: Subject to any disclaimer, the term of this patent is extended or adjusted under 35 U.S.C. 154(b) by 1177 days.

(21) Appl. No.: 11/421,015

(22) Filed: May 30, 2006

(65) Prior Publication Data

US 2006/0205475 A1 Sep. 14, 2006

Related U.S. Application Data

(63) Continuation-in-part of application No. 10/897,181, filed on Jul. 22, 2004, now Pat. No. 7,083,168.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |

(52) U.S. Cl.

USPC ........ 463/16; 463/1; 463/19; 463/20; 463/22; 463/46; 273/269

(58) Field of Classification Search

USPC ......... 463/16, 20, 1, 19, 22, 46; 273/143, 144

See application file for complete search history.

(56) References Cited

U.S. PATENT DOCUMENTS

| | | | | | |
|---|---|---|---|---|---|
| 3,118,677 | A | * | 1/1964 | Lang | 273/144 R |
| 4,871,171 | A | * | 10/1989 | Rivero | 463/20 |
| 5,380,007 | A | * | 1/1995 | Travis et al. | 463/18 |
| 5,566,940 | A | * | 10/1996 | Powell | 273/144 A |
| 5,702,101 | A | * | 12/1997 | Russell | 273/144 B |
| 5,848,932 | A | * | 12/1998 | Adams | 463/20 |

* cited by examiner

*Primary Examiner* — Adetokunbo O Torimiro

(74) *Attorney, Agent, or Firm* — Foley & Lardner LLP

(57) ABSTRACT

A gaming apparatus having a display area with a prize object holder that releasably holds a plurality of prize objects in an individually controlled manner; a rotatable display element having a cavity to receive at least one of the prize objects; and a positioning mechanism which transfers a selected prize object from the prize object holder to the rotatable display element, is disclosed. A controller causes the positioning mechanism to transfer the selected prize object from the prize object holder to the rotatable display element. In one embodiment, the cavity of the rotatable display element may include a plurality of barrier elements which at least partially impede movement of a selected prize object disposed within the rotatable display element. A method of playing a game using the aforementioned apparatus is also disclosed.

26 Claims, 20 Drawing Sheets

GAMING DEVICE AND METHOD OF USE

CROSS REFERENCES TO RELATED APPLICATIONS

This application is a continuation-in-part application of U.S. patent application Ser. No. 10/897,181, filed Jul. 22, 2004. The above referenced application is hereby expressly incorporated by reference in its entirety.

BACKGROUND OF THE INVENTION

The present invention relates to gaming devices and methods of use. More specifically, the gaming device includes at least one prize object that can used to at least partially convey a game outcome as part of its relationship to a rotatable display element.

Gaming Devices

Gaming devices are well known in the art and a large variety of gaming devices have been developed. In general, gaming devices allow users or players to play a game. In many casino-type gaming devices, the outcome of the game depends, at least in part, on a randomly generated event. For example, a gaming device may use a random number generator to generate a random or pseudo-random number. The random number may then be compared to a predefined table to determine the outcome of the event. If the random number falls within a certain range of numbers on the table, the player may win a predefined prize. The table may also contain display information that allows the gaming device to generate a display that corresponds to the outcome of the game. The gaming device may present the outcome of the game on a large variety of display devices, such as mechanical spinning reels or video screens.

Bonus Prizes

Some gaming devices award bonuses in addition to prizes that are awarded in the primary game. A bonus can be defined as an additional prize that is awarded to the player when a predefined event occurs. An example of a bonus game can be found in U.S. Pat. No. 5,848,932 issued to Adams. One of the gaming devices described in this document comprises three spinning reels and a spinning wheel bonus display. When predetermined indicia are displayed on the spinning reels of the primary game, the wheel can be activated to indicate a bonus prize. The bonus prize is awarded in addition to any prizes awarded in the primary game.

In another embodiment described in this document, the gaming device includes a container having one or more movable objects and a transport device for transporting the one or more movable objects within the container. When predetermined symbols are displayed on the reels of the primary game, the transport device can be activated to transport the movable objects while the player is allowed to play the bonus game.

Generally, bonus prizes are offered in such games in order to increase the excitement and enjoyment experienced by players. This attracts more players to the game and encourages players to play longer. When gaming devices attract more players and the players play longer, they tend to be more commercially successful relative to other gaming devices.

Display Devices

In addition, highly visible display devices are utilized on gaming devices in order to attract players. Once players are attracted to the gaming device, they tend to play longer because the display device enhances the stimulation and excitement experienced by players. It is, therefore, desirable for gaming devices to incorporate highly visible display devices.

The applicants believe that display devices tend to be more successful if they are a derivation of a well-known game or theme. They are more successful because players tend to be drawn to games that they instantly recognize. Many players are reluctant to try completely new games because they must spend time to learn the new game. It is, therefore, desirable to provide display devices that are based on well-known games or themes.

The applicants also believe that display devices tend to be more successful if they utilize physical objects rather than simulations. Although video devices and electronic signs can be used for display devices, players are more attracted to display devices that utilize physical objects. Physical objects can be even more effective display devices if they are moveable and they are used in combination with lights and sounds. With the movement of objects within display devices, it is advantageous to use transport devices that will attain maximum effectiveness while occupying a minimum amount of space. It is important to minimize the amount of occupied space because a smaller gaming device generally corresponds to an overall lower cost.

Keno

Upon an initial examination, it would appear to the applicants that the display device of Keno is an excellent choice for a display device for gaming devices. Keno is well known to the playing public, and it utilizes a highly visible and attractive display device. The display device comprises a container with a plurality of numbered balls. The balls in the container are agitated or jumbled, usually by a jet of air, to a state where they ricochet off of the walls of the container.

In the game of Keno, players select numbers that may be drawn from the Keno display device. The display device jumbles or mixes numbered balls in the container and then draws a predetermined number of balls from the container. Players are paid based on the number of balls drawn from the display device that match the numbers they selected.

However, before the present invention, the Keno display device has been unsuitable for use with gaming devices. One of the reasons this is so is because Keno is susceptible to environmental influences. An important aspect of any gaming device is resistance to environmental influences that could affect the results of the game. However, as the balls are jumbled in the Keno ball device, static electricity, dust, and contaminants build up on the balls. This may cause the balls to stick to each other or to components in the display device thereby influencing the randomness of the game. Furthermore, the balls used in Keno displays may have slightly different weights or sizes that subtly affect the outcome of the game.

Another reason the game of Keno has been unsuitable as an indicator for a gaming device is that it requires a great deal of human involvement. In many Keno games, human operators are required to read the numbers of the Keno balls as they are selected and input the numbers into a computer or display. Furthermore, operators must regularly clean the Keno balls and the Keno devices to keep dust and contaminants from building up on the balls. Not only does this require far too much human involvement for an automated gaming device (the greater the human involvement, the greater the cost of operating the game), the game is also susceptible to tampering and cheating.

Because of their susceptibility to environmental influences and tampering and their dependence on human operators and maintenance personnel, Keno games are not allowed in at least one major gaming jurisdiction. Furthermore, these disadvantages have prevented Keno display devices and other devices that use jumbled balls from being adapted for use with gaming devices. The applicants have discovered that what has long been needed is a means for adapting jumbled ball display devices for use with gaming devices. Although reference is made to the game of Keno, it is to be understood that the present invention may be used with almost any type of ball, jumbled ball, or action unit display device, such as lottery balls for example.

Jumbled Ball Displays

Two references that have attempted to utilize jumbled ball displays are U.S. Pat. No. 4,871,171 issued to Rivero and U.S. Pat. No. 5,380,007 issued to Travis et al. Rivero appears to disclose a game device with means for simulating the release of a ball. In this reference, a rotating drum 2 is provided with numbered balls 17. As the drum rotates, a ball is released into a transparent tube 16.

However, Rivero is not intended to show the player the ball that is released from the drum. Rather, the ball is held in the tube, out of view of the player, and an electronic simulation of the ball number is presented in a window 9. This is intended to give the player "the impression" that the ball has been counted. Rivero fails to disclose or suggest displaying actual balls to the player to indicate the outcome of the game or the value of a prize. In addition, in the Rivero device the balls are in a cage and quite exposed to the environment and tampering. The ball cage of Rivero is also mounted on the front side and well below the top of the gaming machine, hiding the ball cage from view of potential game players who are not in position to see the front side of the machine.

Travis et al. appears to disclose a video lottery gaming device with numbered balls 48. However, all of the balls are simulations generated by software and no physical balls are displayed to the player. Travis et al. also fails to disclose or suggest displaying actual balls to the player to indicate the outcome of the game or the value of a prize.

One of the disadvantages with Rivero and Travis et al. is that no actual physical balls are used to display the outcome of a game. This is less desirable because players like to see physical objects rather than electronic simulations of the physical objects. Moreover, players tend to believe that a game device is misleading when the device purports to display a simulation of an object rather than the object itself. This is especially true when the object itself is supposedly available for viewing, as is the case in Rivero.

BRIEF SUMMARY OF THE INVENTION

In certain embodiments, the present invention provides a gaming apparatus comprising a gaming device configured to allow a player to place a wager and play a game of chance having a randomly determined outcome. The gaming apparatus includes a display area having (a) a prize object holder configured to hold prize objects in an individually controlled manner; (b) a plurality of prize objects releasably held within the prize object holder; (c) a rotatable display element having a cavity to receive at least one prize object; and (d) a positioning mechanism configured to transfer a selected prize object from the prize object holder to the rotatable display element. A controller is in communication with the gaming device and the positioning mechanism; the controller is configured to cause the positioning mechanism to transfer the selected prize object from the prize object holder to the rotatable display element.

The cavity of the rotatable display element may also include a plurality of barrier elements configured to at least partially impede movement of the selected prize object disposed within the rotatable display element. Typically, the rotatable display element may further comprise a plurality of display segments where each segment is defined by the spacing between any two adjacent or consecutive barrier elements.

In another embodiment, the prize object holder of the gaming apparatus is at least partially circular and the display segments of the rotatable display element are located adjacent to a circular portion of the prize object holder. The prize object holder and the rotatable display element may be arranged in a concentric relationship to each other.

In a further embodiment, the controller of the gaming apparatus may be configured to select one of the plurality of display segments in order to at least partially convey the game outcome. For example, the game outcome may be conveyed to the player when a selected prize object comes to rest in one of the display segments after movement of the rotatable display element has been terminated.

The present invention may also allow for the prize objects held in the prize object holder to be hidden from view of the player to enhance anticipation and surprise of players using the gaming apparatus. In this case, the gaming apparatus may further include a moveable object container and a plurality of moveable objects held within the container. Typically, this embodiment is configured to provide the illusion to the player that the prize object transferred to the rotatable display element has been selected from the moveable objects in the moveable object container.

In another embodiment the present invention provides a gaming method where a player is allowed to place a wager on, and is presented with, a game of chance. A game outcome is determined and at least one game related indicium is displayed in the rotatable display element. A plurality of prize objects are releasably held in an individually controlled manner in the prize object holder and a selected prize object is moved from the prize object holder to the rotatable display element where the selected prize object is allowed to move freely within the rotatable display element during movement of the rotatable display element. The rotatable display element may be provided with a plurality of display segments and one of the display segments may be selected to at least partially convey a game outcome to the player.

In another embodiment, the method of the present invention involves moving the prize object holder during play of the game. The prize object holder may then be stopped and a selected prize object is caused to enter the rotatable display element where the combination of the selected prize object and the display segment receiving the released prize object conveys the game outcome to the player. The game outcome may also include a bonus qualifying event where further action by the player is allowed or required.

The method of the present invention may also allow the player to provide input using a player input device where the player input at least apparently allows the player to affect the game outcome, either by influencing movement of the prize object holder or movement of the rotatable display element. In addition, movement of the prize object holder or the rotatable display element may be stopped if the player does not provide input within a predetermined time period.

Displaying game related indicia, that is, any game related information, may include distributing the game related indicia around the prize objects held in the prize object holder and displaying the game related indicia sequentially, randomly or in a pattern. In one embodiment, the game related indicia are distributed among the display segments of the rotatable display element.

For the purposes of the present invention, it is understood that "determining (or determination of) a game outcome" shall mean actively causing, deciding, dictating, choosing, selecting or affecting the outcome of the game. This is in contrast to detecting, learning, identifying, discovering, ascertaining or finding out the result of the game outcome.

Among the advantages of the present invention are those directed to:

the ability to provide game players with a more exciting and desirable gaming experience;

the ability to attract more patrons to play a game;

providing longer play times and a greater payout possibility for a player;

providing greater revenues for gaming operators;

providing a gaming device that utilizes a visually appealing and highly visible display device;

providing a gaming device having a prize object holder;

providing a gaming device having a rotatable display element that may receive prize objects;

providing a gaming device that may allow a player to at least have the illusion of being able to affect a game outcome; and providing a variety of ways to indicate a game outcome.

These and other advantages may be realized by reference to the remaining portions of the specification, claims, and abstract.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION OF THE INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made with out departing from the scope of the present invention.

In the Detailed Description below, the applicants utilize various spatially orienting terms such as "upper," "lower," "horizontal," and "vertical." It is to be understood that these terms are used for ease of description of the preferred embodiments with respect to the drawings but are not necessarily in themselves limiting or requiring of an orientation as thereby described in the following Detailed Description.

Figure 1A:
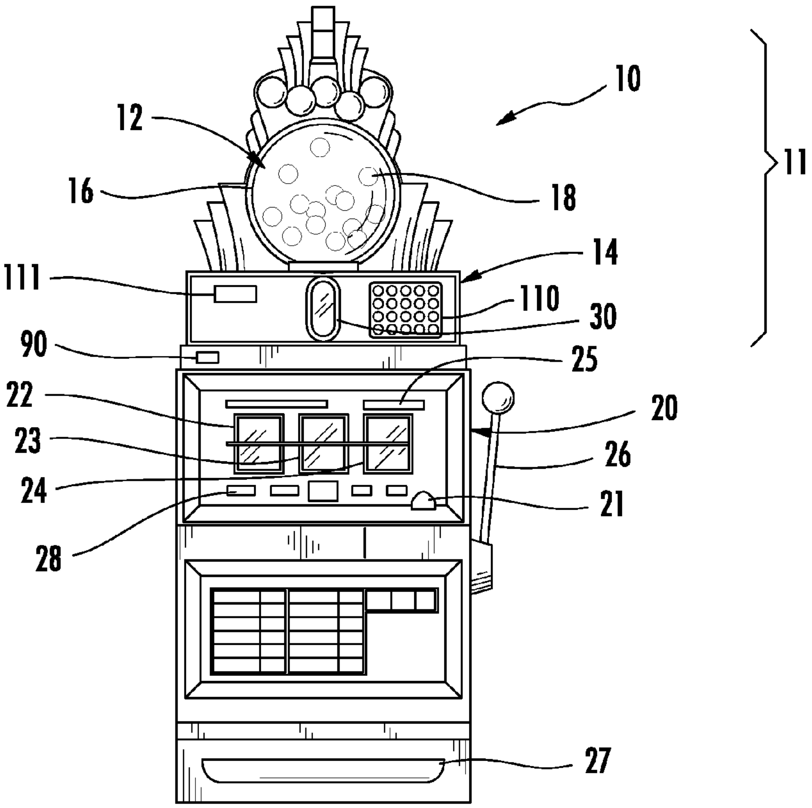
FIG. 1A is substantially a front view of a gaming device.

As seen in FIG. 1A, one embodiment disclosed herein comprises a gaming device, generally indicated by reference number 10. Gaming device 10 comprises a display device 11 and a game apparatus 20. Display device 11 may comprise a jumbled ball display 12 and a prize display 14.

Game Apparatus

With continuing reference to FIG. 1A, game apparatus 20 may be any of a large number of devices that are adapted to allow players to play a game. For example, game apparatus 20 may utilize reel displays, such as spinning reels 22-24 or a video display (not shown), to display outcomes of the game. Means may also be provided for accepting wagers, such as a coin slot 21 or card reader 25, and for awarding prizes, such as a coin dispenser 27. A handle 26 and button 28 are provided for activating game apparatus 20 to begin a game. In at least one preferred embodiment, game apparatus 20 may be an S Plus model or S2000 gaming device manufactured by International Game Technology in Reno, Nev.

Game apparatus 20 is preferably controlled by an electronic controller 82 (see FIG. 2A) that utilizes a random number generator. The random number generator produces a random or pseudo random number for each game. The outcome of the game may be determined by comparing the random number to a table of outcomes stored in a memory and accessed by controller 82. A number of different tables of outcomes may be used and different tables may be used for different games. The tables can be designed so that different prizes have different probabilities of being awarded. Such design techniques are well known in gaming. Examples of such designs are shown in U.S. Pat. No. 4,448,419, issued to Telnaes, and U.S. Pat. No. 5,456,465, issued to Durham. Controller 82 causes spinning reels 22-24 of the video display to show the outcome of the game that corresponds to the outcome of the random number generator. It is recognized that game apparatus 20 may operate in many other ways and still achieve the objects of the present invention.

Game apparatus 20 may also be capable of producing a bonus-activating event. This event may be many different types of events. For example, a bonus-activating event may comprise displaying a particular symbol, such as a "bonus" symbol, or combination of symbols, such as three "7" symbols, on reels 22-24. If the game being played is poker based, the bonus-activating event may be occurrence of a certain hand, such as a royal flush. Furthermore, a bonus-activating event may occur when a player accumulates a number of symbols or game outcomes over a number of separate game plays. For example, a bonus-activating event may occur when the player receives three "bonus" symbols during a period of time. The bonus-activating event may be based on an external event. For example, a bonus-activating event may occur when a group of players obtain a certain result.

Jumbled Ball Display

With continuing reference to FIG. 1A, jumbled ball display 12 comprises a container 16 that is adapted to hold a plurality of display balls 18. Container 16 is at least partially transparent allowing players to view display balls 18 inside of the container. Container 16 is made of a transparent material, such as plastic or glass. In the preferred embodiment, container 16 is made of acrylic. Suitable containers of this type may be obtained from Tripp Plastics of Reno, Nev. However, container 16 may also be a wire cage of a type that is used in some Keno games.

Container 16 may have many different shapes, such as a sphere, cube, cylinder, triangle, etc. In one embodiment, container 16 is substantially spherical with a partially flat back (not shown). The flat back allows container 16 to be large while still allowing gaming device 10 to placed against a wall, another gaming device, or other objects.

Although display balls 18 are preferably similar to Keno balls, many other types of balls may be used. For example, display balls 18 may be ping-pong balls or rubber balls. Display 12 also comprises, an agitator (not shown in FIG. 1) to agitate or jumble display balls 18 within container 16. The agitator may be a stream of air or a mechanical mixing device. The agitator causes the balls to bounce and ricochet off of the walls of container 16. In the preferred embodiment, a stream of air is used as an agitator and container 16 comprises an off center opening for the stream of air. The opening is off center to increase the initial agitation of display balls 18.

Fins (not shown) may also be provided at the bottom of container 16 to help agitate display balls 18. The fins support display balls 18 when they are resting at the bottom of container 16. This helps air circulate underneath display balls 18 to lift and separate the balls. The purpose of jumbled ball display 12 is to attract and entertain players. When display balls 18 are agitated, they produce a vivid display that attracts the attention of people nearby and provides an exciting display for players playing gaming device 10. Display Balls 18 are preferably kept separate from balls used in display device 14.

Figure 1B:
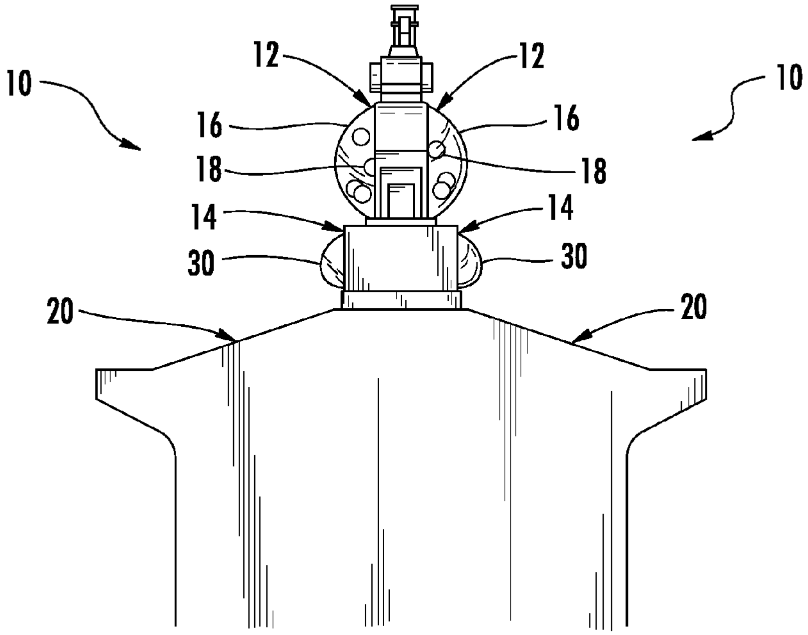
FIG. 1B is substantially a side view of an alternative embodiment of a gaming device.

FIG. 1B represents an embodiment in which two gaming devices 10 are placed back to back. Each gaming device 10 comprises a game apparatus 20. Game apparatuses 20, shown in FIG. 1B, is known as a "slant top" for their sloping upper surfaces. However, other types of gaming devices, such as the upright game apparatus 20 shown in FIG. 1A, may also be used.

In this embodiment, a separate jumbled ball display 12 is provided for each game apparatus 20. Each jumbled ball display 12 may comprise container 16 in the shape of a hemisphere. Containers 16 may be placed back to back so that the two containers have a spherical appearance when viewed from the side. Other shapes, such as cubes and cylinders, may also be used. A mirror may be placed at the back of each container 16 to enhance the appearance of the jumbled ball displays 12 by reflecting images of jumbled display balls 18 outward toward the players. Containers 16 may also be one single container that is divided in two by a mirror or other partition. Each container 16 has its own independently operated agitator and jumbled display balls 18. Each game apparatus 20 has its own independently operated prize display 14 with display window 30.

Prize Display

Referring to FIGS. 1A and 1B, prize display 14 is adapted to select a prize ball and display the ball to a player. When a bonus-activating event occurs, prize display 14 senses this, selects a prize ball, and displays the ball in a display window 30.

Figure 2A:
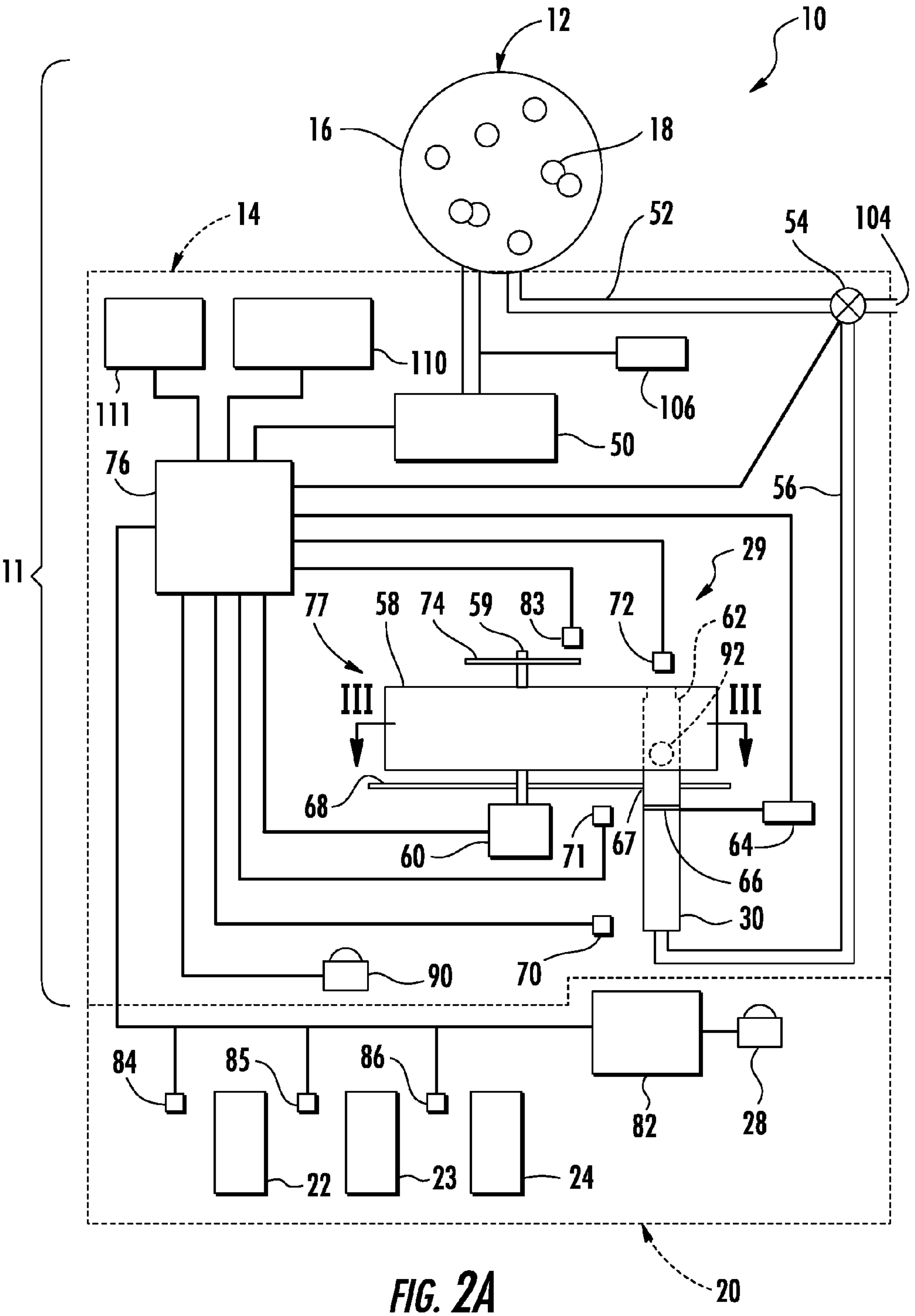
FIG. 2A is substantially a schematic diagram of a gaming device.

Turning now to FIG. 2A, prize display 14 comprises a controller 76 that is adapted to control the operation of the device. Controller 76 may be one or more computers or processor boards. For example, in this embodiment, controller 76 comprises a bonus controller and stepper motor controller, which may be manufactured by Progressive Solutions in Carmichael, Calif., a core module by Z-World in Davis, Calif., and a sound board by Cleverdevices in Syosset, N.Y. Other, equally suitable devices may be purchased from other manufacturers. It is recognized that controller 76 may be a single processor or processor board. Furthermore, it is also recognized that controller 76 and controller 82 may be combined in a single processor or processor board.

Controller 76 is configured to detect when a bonus activating event occurs in game apparatus 20. This may be accomplished by game apparatus controller 82 transmitting a signal to controller 76 that a bonus event has occurred. For example, controller 82 may determine the outcome of each game and when a bonus-activating outcome occurs, it transmits a signal to controller 76. Alternatively, controller 76 may periodically interrogate controller 82. In another embodiment, one or more sensors may be provided for determining if a bonus activating event has occurred. For example, sensors 84-86 may sense the positions of reels 22-24. When reels 22-24 are in a bonus activating position, controller 76 would sense this position and begin a bonus sequence (described below). Sensors may also be provided external to gaming device 10 to detect external bonus-activating events.

Controller 82 may also transmit a variety of information to controller 76. For example, controller 82 may signal when coins or currency have been inserted, when a game starts, when an error has occurred, and when a sensor detects tampering.

When controller 76 detects a bonus-activating event, it may begin a bonus sequence by activating display 110. Display 110 may comprise many different kinds of display devices, such as video screens, lights, light emitting diodes, etc. Display 110 may comprise its own controller that is adapted to generate a variety of displays.

Display 110 may indicate that a player has qualified for a bonus round and prompt the player to perform an action. In the preferred embodiment, the player is prompted to activate the bonus sequence by pressing input device 90. Input device 90 may be a simple button, a keyboard, or a touch screen display. In the embodiment in which the player must accumulate a number of bonus symbols to qualify for a bonus, display 110 may indicate the number of symbols the player has received.

When controller 76 detects input device 90 being activated, the controller would activate the agitator in jumbled ball display 12. In the preferred embodiment, the agitator comprises blower 50, which blows air into container 16. Alternatively, the agitator may begin automatically and input device 90 may be used to initiate the display sequence. In another embodiment, controller 76 may wait a predetermined time period for the player to activate input device 90. If the player does not activate input device 90 in that time period, controller 76 would automatically activate the display 12 and initiate the display sequence. In yet another embodiment, controller 76 automatically initiates the display sequence in a predetermined time period, independent from input device 90, and input device 90 is only used to activate the jumbled ball display 12. Of course, no input device may be used and controller 76 may automatically activate display 12 and begin the display sequence.

To display a prize ball, controller 76 performs a routine to determine which ball will be displayed. This may be performed by a number of methods that are well known in the art. For example, prize balls 92 may be sequentially displayed or displayed based on external events, such as certain bonus activating events may always cause the same prize ball to be displayed.

In one embodiment, however, prize balls 92 are randomly selected. Controller 76 generates a random number and then compares the random number to a pay table similar to that described for game apparatus 20 or as described in U.S. Pat. No. 5,823,874, issued to Adams. A simple pay table may appear as follows:

TABLE 1

| Random Number | Prize Ball Number | Amount Paid |
|---|---|---|
| 0.00 to 0.50 | 1 | $1.00 |
| 0.51 to 0.75 | 2 | $5.00 |
| 0.76 to 0.95 | 3 | ×2 |
| 0.96 to 1.00 | 4 | $1,000.00 |

For example, if the random number generator produced 0.65, prize ball number 2 would be displayed and $5.00 would be awarded to the player. If the random number generator produced 0.80, prize ball number 3 would be displayed. Prize ball number 3 is a multiplier ball that multiplies some amount produced by game apparatus 20. Gaming apparatus 20, for instance, may award $20 and the multiplier ball would multiply this by two, awarding the player $40.

This embodiment is not necessarily limited to the example pay table shown. A greater number of prize balls may be used and, as will be discussed below, a combination of prize balls may be displayed. Furthermore, different kinds of prizes, besides monetary prizes, may be awarded. For example, the prizes may be goods, services, or additional games. The goods and services may be awarded in the form of physical objects, tickets, vouchers, coupons, etc. Additional games may be presented in the form of tickets, such as scratch off lottery tickets. In the embodiments in which tickets, vouchers, and coupons are used, the objects are dispensed using an internally or externally mounted dispenser 111. Such dispensers are well known in the art.

Once controller 76 determines the prize ball to be displayed and the prize to be awarded, the controller activates a positioning mechanism 77. Positioning mechanism 77 is adapted to position a selected prize ball (that is separate from display balls 18) so that it can be displayed. Positioning mechanism 77 may utilize a large variety of devices to achieve its purpose. In one embodiment, all of the prize balls are held in a ball holder 58. Ball holder 58 may be made from a variety of materials, such as plastics, metals, or composites. In one embodiment, ball holder 58 is cast high-density urethane foam that is machined to obtain a precise shape. In the preferred embodiment, ball holder 58 is injection molded plastic.

Prize balls 92 preferably have a similar appearance to display balls 18 in container 16. This creates the illusion that balls displayed in display window 30 originate from container 16. At least one of prize balls 92 have a symbol that is capable of indicating a prize to be awarded to the player.

Prize balls 92 are stored in ball holder 58 in an individually controlled manner so that individual balls can be selectively removed from the ball holder. This allows particular balls with particular symbols or values to be individually manipulated and displayed when desired. This may be accomplished in different ways. In the preferred embodiment, ball holder 58 comprises a chamber 62 for each prize ball 92 stored in the holder. A display mechanism 29 is provided for removing ball 92 stored in chamber 62, displaying the ball, and replacing it in the chamber.

Figure 3:
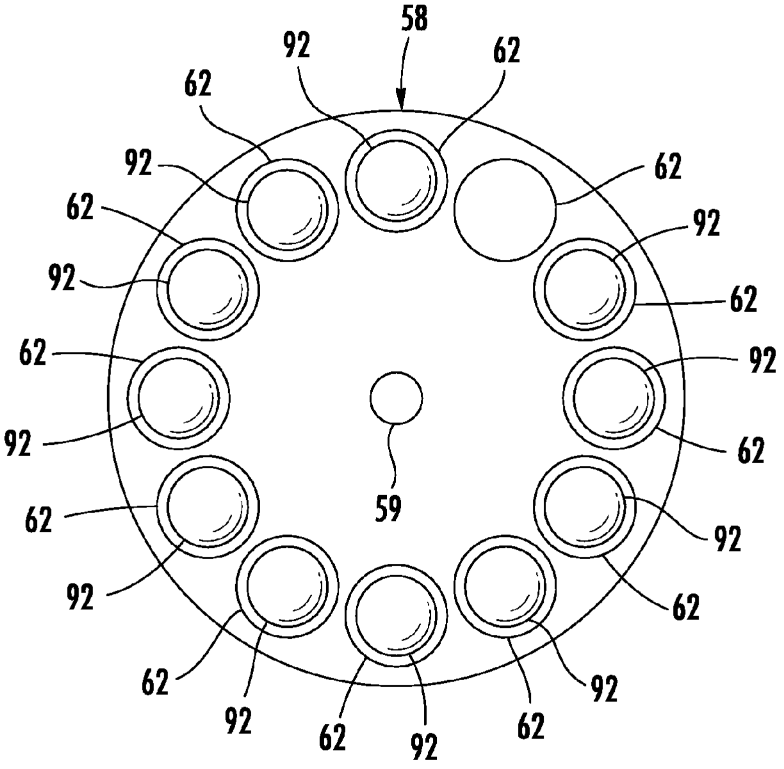
FIG. 3 is substantially a top cross sectional view of the ball holder taken along line III in FIG. 2A.
Figure 4:
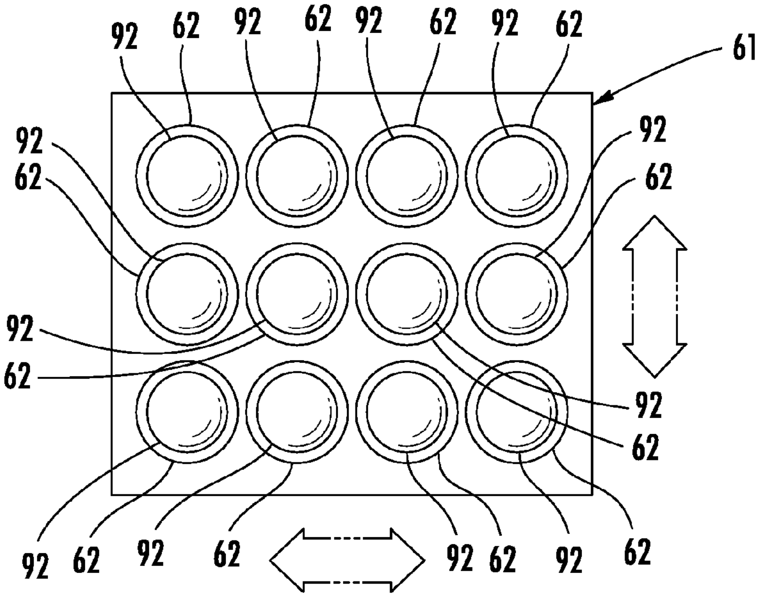
FIG. 4 is substantially a top cross sectional view of an alternative ball holder.

In another embodiment, ball holder 58 is cylindrical as illustrated in FIG. 3. Chambers 62 are positioned outward from a central axis 59 of ball holder 58, near the periphery of the holder. Thus, chambers 62 may be positioned by rotating ball holder 58 around its central axis 59. Ball holder 58 may be provided in different configurations. For example, as shown in FIG. 4, ball holder 61 may be square or rectangular with chambers 62 arranged in rows and columns. In this embodiment, controller 76 is programmed with the location of chambers 62 and ball holder 61 is positioned by moving it laterally and longitudinally. Stepper motors and gears may perform the lateral and longitudinal positioning (not shown).

Returning to FIG. 2A, positioning mechanism 77 comprises a stepper motor 60 for rotating holder 58. Wheel 74, rigidly attached to holder 58, and sensor 83, not attached to the holder, are provided for determining the angular position of the holder. Thus, controller 76 can position a ball 92 in holder 58 where it can be removed and replaced by rotating the holder and monitoring its angular position. The angular position of each prize ball 92 is stored in memory in controller 76. Sensor 83 may be an infrared source and detector and the periphery of wheel 74 may comprise portions with different reflective characteristics, such as physical holes or gaps or absorbent paint lines.

Alternatively, an optical flag configuration similar to that described in U.S. Pat. No. 4,911,449, issued to Bertram, may be used.

Figure 5A:
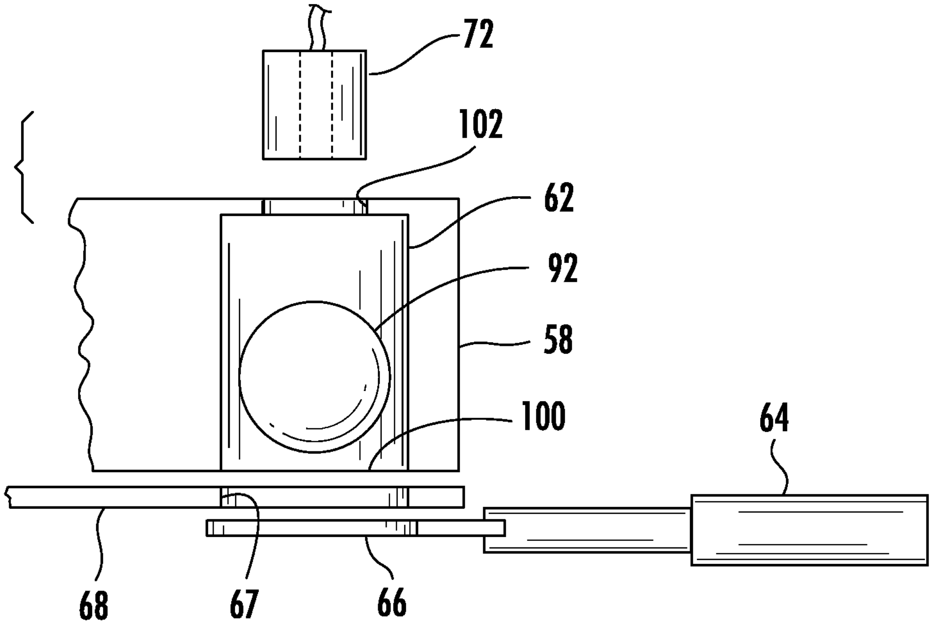
FIG. 5A is substantially an enlarged view of the ball holder shown in FIG. 2A.

In one embodiment, holder 58 is arranged to allow the force of gravity to remove balls 92 from the holder. Referring now to FIGS. 2A and 5A, each chamber 62 has a lower opening 100 that is large enough for prize ball 92 to pass through. A plate 68 is provided on the lower surface of holder 58 for preventing prize balls 92 from falling out of chambers 62. A hole 67 is provided in one portion of plate 68 for allowing ball 92 to pass through the plate. A gate 66 blocks ball 92 until it is opened by an actuator 64. Gate 66 may cover the entire hole 67 or just a portion of it and it may be operated in a sliding or hinged manner. Actuator 64 may be an electrical solenoid actuator.

Figure 5B:
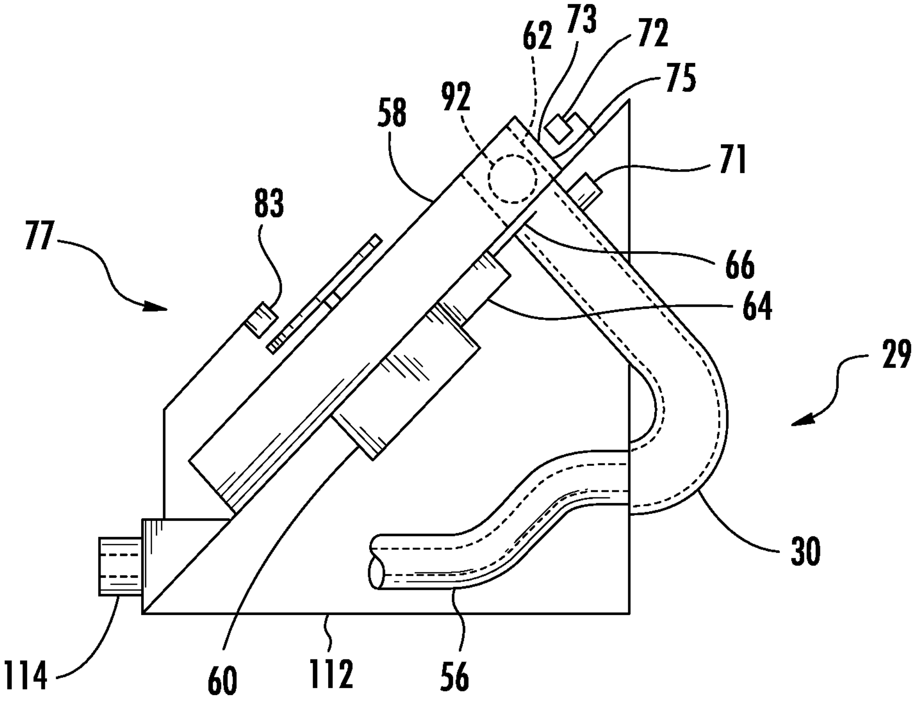
FIG. 5B is substantially a side elevational view of positioning and display mechanisms.

FIG. 5B represents another embodiment in which a chassis 112 supports ball holder 58 at approximately a forty-five degree angle to the vertical. Mounting grooves (not shown) may be provided in prize display 14 for slidably receiving chassis 112 and connector 114 may be provided for connecting electrical circuits and devices to power supplies and controller 76. One of the advantages of this embodiment is that positioning mechanism 77 and display mechanism 29 can be easily serviced by removing chassis 112 from prize display device 14.

Referring to FIGS. 2A and 5A, in normal operation, after controller 76 has determined which ball is to be displayed, the controller rotates holder 58 until the desired prize ball 92 is positioned over the plate hole 67. At the appropriate time, controller 76 activates actuator 64 to open gate 66. The force of gravity then pulls prize ball 92 downward through hole 67 into display window 30. Display window 30 may be a chamber with a transparent or partially transparent wall that allows the player to see selected prize ball 92. In the preferred embodiment, display window 30 comprises a tube that projects outward from the front surface of prize display device 14. This allows players to view prize ball 92 from many different angles and see symbols on the ball. Sensors 70 and/or 71 may be used to verify that prize ball 92 has fallen into display window 30. If sensors 70 and/or 71 do not detect ball 92 in its proper position, controller 76 may enter an error mode.

If the ball is detected in its proper position, controller 76 may cause display 110 to display the prize, if any, that the player has won. Other effects may also be presented, such as pre-recorded sound from speakers. If the actual prize is money, the amount of the prize may be added to the player's credit meter or the prize may be dispensed from dispenser 111 or coin dispenser 27.

After ball 92 has been displayed long enough, controller 76 operates a valve 54 to divert exhaust air from container 16. While blower 50 is in operation, air is allowed to escape container 16 through an exhaust duct 52. Valve 54 is used to divert air from a vent 104 to a display duct 56. Display duct 56 directs air to the bottom of display window 30 where it blows the ball 92 upwards back into chamber 62. An upper opening 102 is provided in chamber 62 for allowing air to escape from the chamber thereby producing an air current. Sensors 72 and/or 71 may be used to verify that ball 92 has returned to chamber 62. If the ball is not detected in its proper position, controller 76 may enter an error mode and an attendant is called. In the preferred embodiment, shown in FIG. 5B, sensor 72 is placed next to the peripheral wall 75 of ball holder 58 and a hole 73 is provided in the peripheral wall next to each chamber 62.

Components of the apparatus may be arranged alternatively so that ball display window 30 is located above holder 58 and ball 92 is blown upwards into the display. When valve 54 is closed, the force of gravity pulls ball 92 back into chamber 62. In this alternate embodiment, once ball 92 has returned to chamber 62, controller 76 closes gate 66 by activating actuator 64, turns off blower 50, and waits for the next activating event.

A power failure or power surge could cause actuator 64 to malfunction and improperly open gate 66 while prize display 14 is idle. This would cause prize ball 92 to fall out of chamber 62 into display window 30, thereby giving a false indication that the player had won a prize. In order to prevent this, in the preferred embodiment, at least one chamber 62 does not have prize ball 92 (see FIG. 3). This empty chamber is positioned over hole 67 whenever prize display 14 is idle.

Of course, other methods for agitating display balls 18 may be provided. In addition, other methods for actuating and displaying prize balls 92 may be used. The present invention is not limited to any particular method or apparatus for agitating or displaying display balls 18 and/or prize balls 92.

For example, in certain embodiments, including embodiments discussed further below, display balls 18 may be agitated by actuation of jumbled ball display 12. If display balls 18 are agitated by actuation of jumbled ball display 12, it may be desirable to employ other methods of actuating and displaying prize balls 92. For example, if an air compressor is not needed for agitation of display balls 18, it may be beneficial to modify the method of displaying prize balls 92 so that the air compressor may be eliminated from game apparatus 20.

Figure 2B:
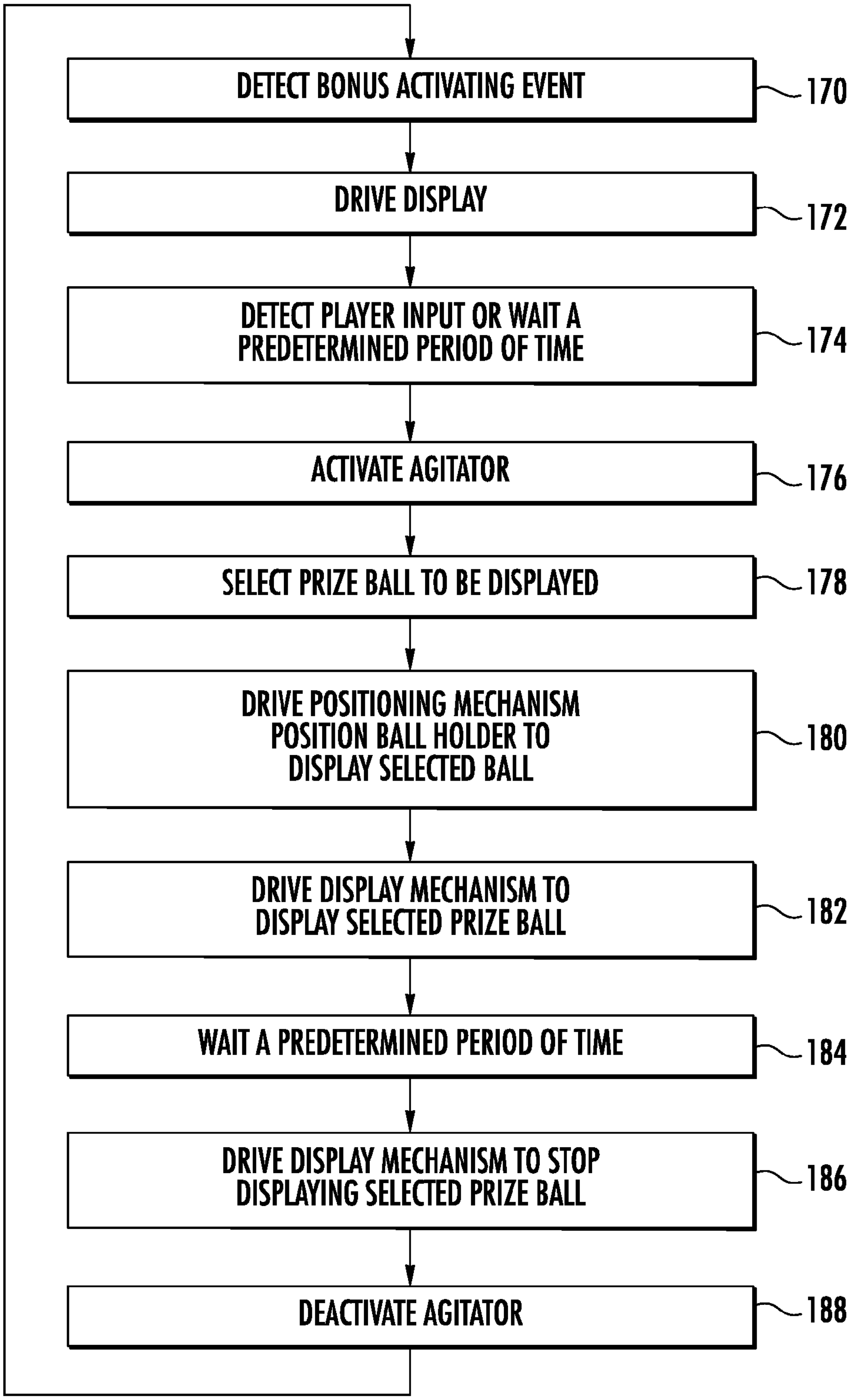
FIG. 2B is substantially a flow chart showing one of the many ways the display device may be operated.
Figure 2C:
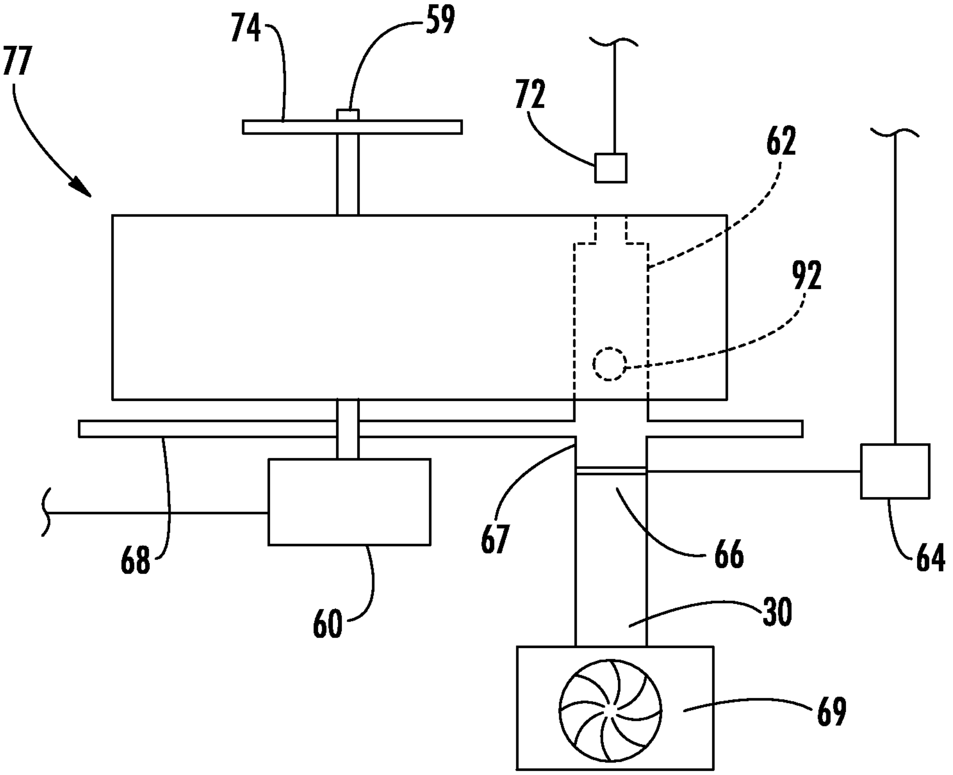
FIG. 2C is substantially a schematic diagram of an alternate prize ball display mechanism for use in the gaming device of FIG. 2A.

For example, as illustrated in FIG. 2C, rather than opening valve 54 to divert air to display duct 56 (as in FIG. 2A), an air source or blower can be located below display window 30. For example, a fan 69 may be placed below display window 30. When activated by controller 76, fan 69 operates and creates a stream of air that blows display ball 92 in display window 30 back into chamber 62. Although many fans can be used, one suitable fan is DC brushless fan motor model number BG0703-B044-000 available from Minebea Co., Ltd. of Tokyo, Japan. Of course, other air sources besides fans may be used without departing from the scope of the present invention.

Because some balls are very light, static electricity can cause the balls to stick to each other and to other components. To prevent this, a variety of static discharge devices 106 may be placed in various locations in the apparatus. In one embodiment, static discharge device 106 (FIG. 2A) is a bare stranded copper wire with its strands spread out. The wire is placed in the flow of air between agitator 50 and container 16 and wire is attached to a common ground.

Prize display 14 of the present invention may also comprise means for simultaneously displaying a plurality of balls 92. To accomplish this, plate 68 may have multiple holes 67 (not shown), each with its own gate 66 and actuator 64, for supplying balls to multiple display windows. Thus, holder 58 may be positioned so that the appropriate ball is positioned over the appropriate hole 67 for supplying the appropriate display window 30. Alternatively, a plurality of ball holders 58 may be provided, each one supplying balls to a separate display window 30.

Figure 6:
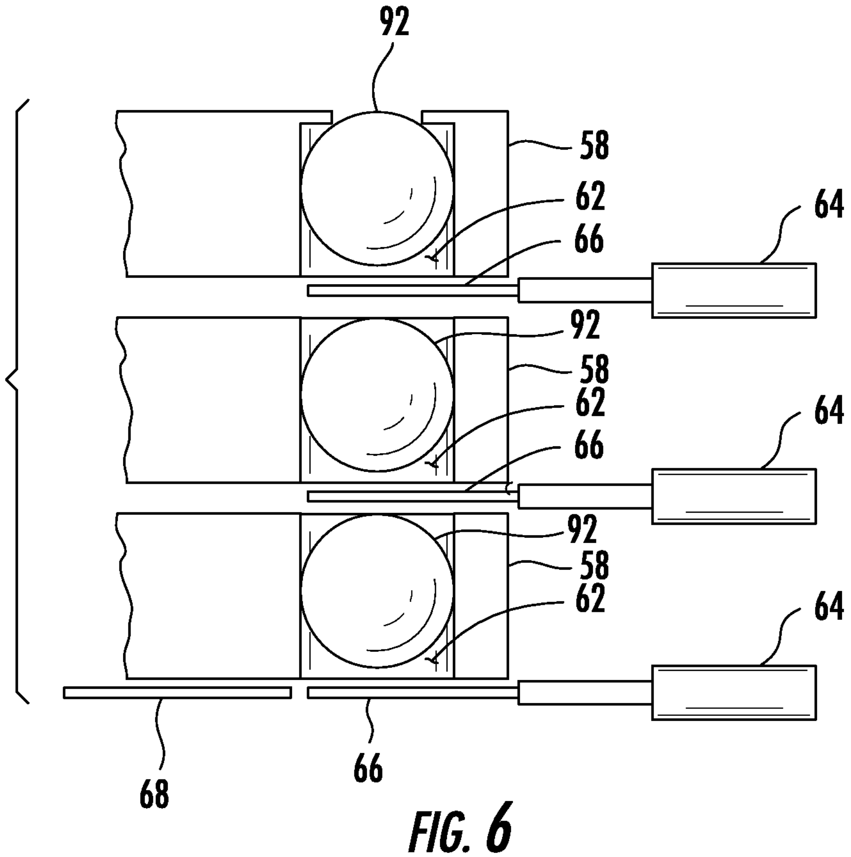
FIG. 6 is substantially a schematic diagram of an alternative embodiment using multiple stacked ball holders.

In yet another embodiment, seen in FIG. 6, a plurality of separately controlled ball holders 58 are arranged in a stack. Each ball holder 58 is rotated to a position so that chambers 62 are aligned above display window 30 (FIG. 1A). Gates 66 are then opened and balls 92 are allowed to fall into display window 30. In this embodiment, display window 30 is large enough to display three balls simultaneously. When the display period has ended, balls 92 are blown back into chambers 62 and gates 66 are closed to separate and contain the balls. The action of gates 66 separates prize balls 92 into separate chambers 62.

With multiple balls being displayed, it is possible to use combinations of balls to indicate various bonus outcomes. It is also possible to replace the primary display of a gaming device with selector and prize display device 14. In other words, game apparatus 20 may be entirely replaced with selector and prize display device 14.

Figure 7:
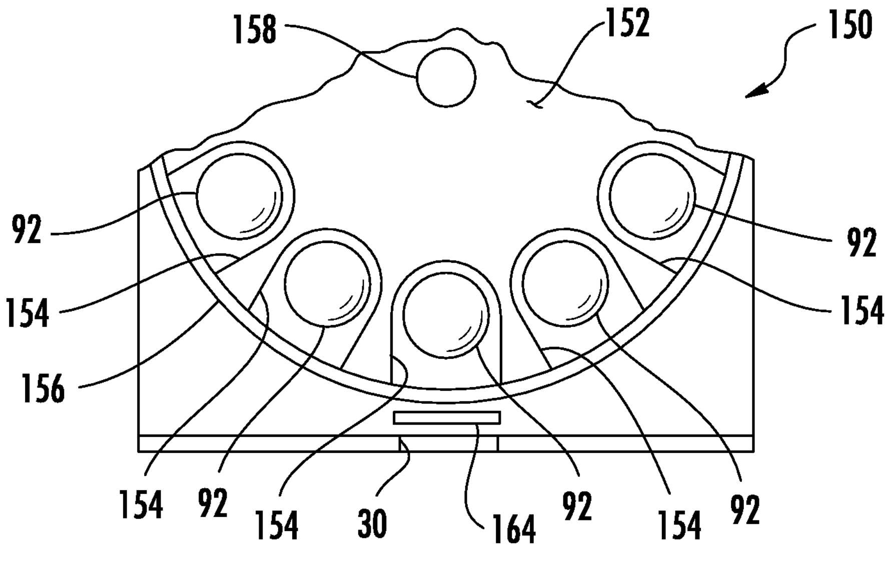
FIG. 7 is substantially an alternative display mechanism.

As seen in FIG. 7, the apparatus may comprise an alternative display mechanism 150. Display mechanism 150 comprises a cylindrical ball holder 152 that may be rotated around its central axis 158. Ball holder 152 comprises a plurality of chambers 154 positioned along the periphery of the holder, each chamber is adapted to hold ball 92. Unlike the embodiment described in FIG. 2A, it is not necessary to remove and replace balls 92 from chambers 154. Instead, at least a portion of the outer wall of each chamber 154 comprises a transparent material that allows players to view balls 92 inside the chamber. The transparent wall may comprise a ring of transparent material 156 that surrounds holder 152. A shutter device or door 164 may be provided between display window 30 and holder 152 for blocking the view of players while the holder is rotated. Although this embodiment has the advantage of a simpler mechanism, it may be less entertaining to players because it may be more apparent to the players that balls 92 do not originate from jumbled ball display 12.

Figure 1C:
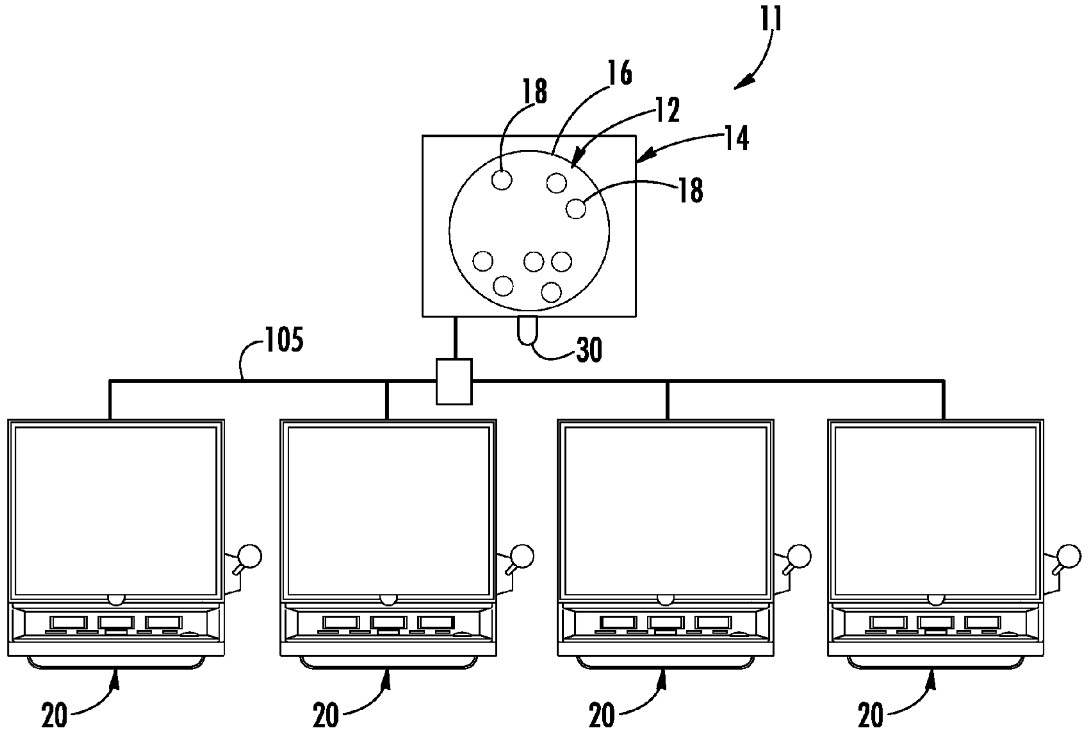
FIG. 1C is substantially a top schematic diagram of the display device in use with a plurality of game apparatus.

As seen in FIG. 1C, a single display device 11 may also be used with a plurality of game apparatus 20. In this embodiment, each game apparatus is in communication with display device 11 by a communication device 104. Communication device 104 may be a network cable, such as an Ethernet cable, and appropriate hardware, such as network interface cards, may be included in display device 11 and game apparatus 20. When one of the game apparatus 20 produces a bonus-activating event, a signal is sent to display device 11. A prize ball may then be selected and displayed as described above.

Turning now to FIG. 2B, the operation of prize display 14 begins when controller 76 detects a bonus-activating event 170. Controller 76 may then drive display 110 to display an appropriate presentation or message 172. As discussed above, controller 76 may wait for player input from input device 90 (shown in FIG. 2A) or it may wait for a predetermined period of time 174. At some point, controller 76 activates the agitator 176 and selects a prize ball to be displayed 178 from ball holder 58. Controller 76 then drives positioning mechanism 77 to position ball holder 58 so that the selected prize ball may be displayed 180 and causes display mechanism 29 to display the selected ball 182. Controller 76 may then wait a predetermined period of time so that the player may see the displayed prize ball 184, after which it causes display mechanism 29 to stop displaying the selected prize ball 186. The agitator is then deactivated 188 and controller 76 returns to a monitoring state to detect the next bonus activating event 170.

Figure 8:
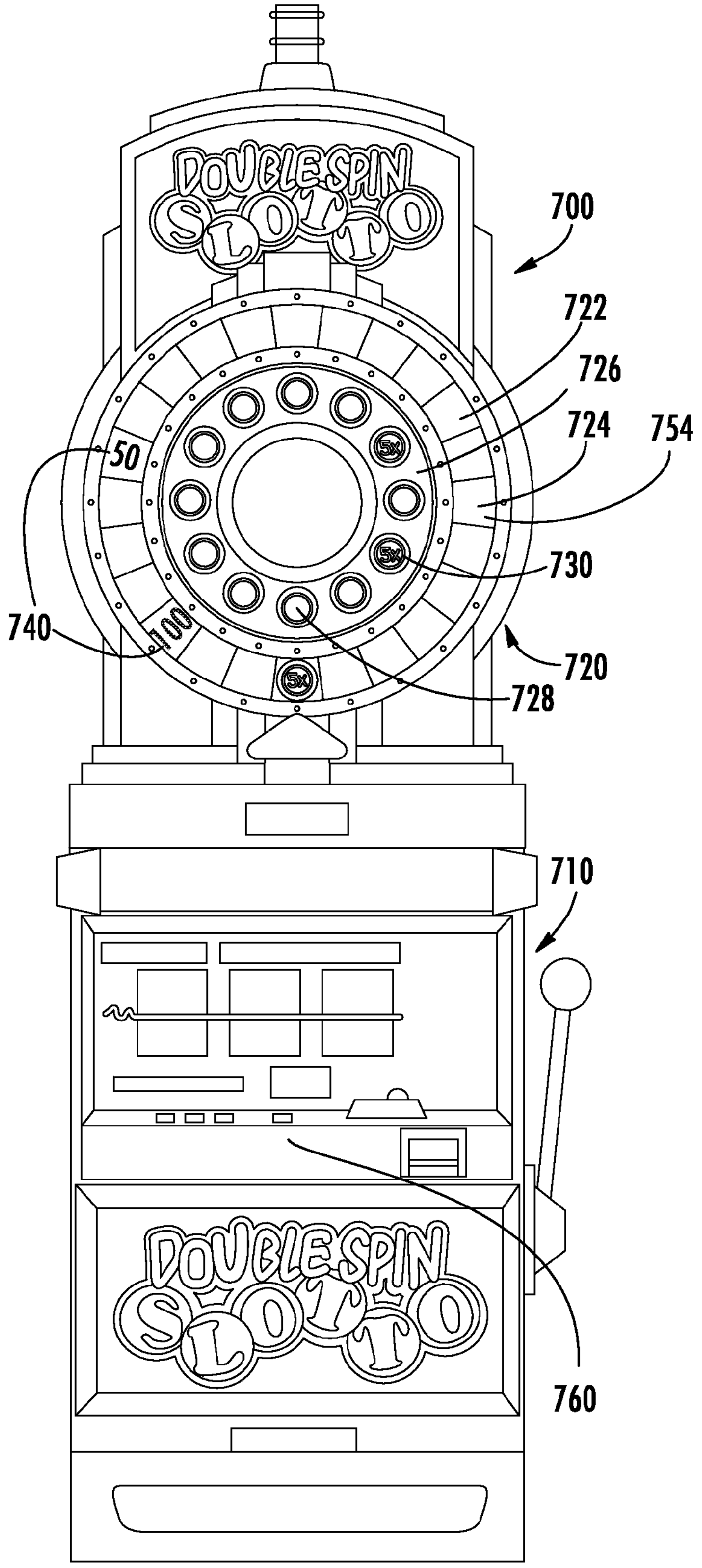
FIG. 8 is substantially a front elevational view of an embodiment of a gaming apparatus of the present invention.

FIG. 8 illustrates an embodiment 700 with moveable objects 730, which may be prize balls or display balls. FIG. 8 shows a gaming apparatus 710 having a prize display 720. Prize display 720 has a moveable display object 722. Moveable display object 722 is depicted as a wheel, however other shapes and designs may be used for moveable object 722. In certain embodiments, moveable display object 722 may have one or more compartments, or segments, 724.

Moveable display object 722 may be moveable relative to moveable objects 730. Compartments 724 may be designed to receive one or more moveable object 730. Each compartment 724 may have one or more game related indicium 740. Game related indicium 740 may represent a multiplier, a prize amount, a good, a service, a jackpot prize or other awards. Game related indicium 740 may be a character, symbol, picture, color, or other representation. In other embodiments, compartments 724 may be decorated or accented with various graphics, lights, and designs that serve to make the prize display 720 more aesthetically pleasing, but do not convey game related information.

Figure 9:
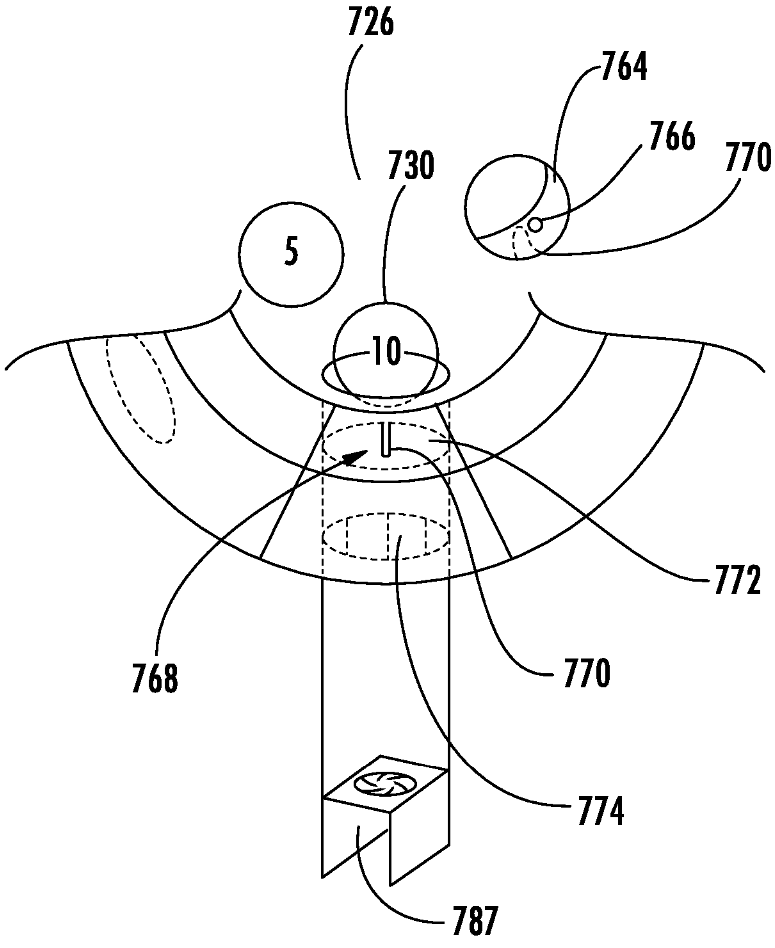
FIG. 9 is substantially front perspective view of a prize display for an embodiment of the gaming device of FIG. 8.

FIG. 9 presents one possible embodiment of prize display 720. Prize display 720 may include a moveable object holder 726 (also shown in FIG. 8 with chamber 728 for holding the moveable objects 730), which may be the same as or similar to previously described ball turrets, including those shown in FIGS. 2A, 2C, and 3-7. Moveable object holder 726 may contain a plurality of recesses 764. A moveable object 730 may be retained by each recess 764. Recesses 764 may include a sensor 766 to detect when a moveable object 730 is inside the recess 764. A retaining mechanism 768 may be included to selectively secure a moveable object 730 in a recess 764. In one embodiment, retaining mechanism 768 includes a pin 770 that is in communication with a controller (not shown). Pin 770 is normally extended, preventing moveable object from passing through opening 772. When the controller determines that a particular moveable object 730 should be selected and displayed to indicate a game outcome, the controller may direct pin 770 to retract. Moveable object 730 may pass through opening 772, such as by rolling on a curved surface. Moveable object 730 may thus be directed into an appropriate compartment 724.

In at least one embodiment, each compartment 724 has an opening 772. Each compartment may also have a vent 774. Vent 774 may allow air to pass through, which may be used to direct moveable object 730 back into its corresponding recess 764. In at least one embodiment, air is channeled into recess 764 such that continued application of an air stream to recess 764 once moveable object 730 is located in recess 764 will cause moveable object 730 to spin. Sensor 766 may be used to determine when moveable object 730 is in a desired position. Once moveable object 730 is in the desired position, the air current may be stopped. In this way, moveable object 730 may be manipulated such that indicia 740 are viewable by the player. In other embodiments, indicia 740 may be arranged on moveable object 730 such that at least one indicium 740 is visible no matter what position moveable object 730 is in.

Air may be supplied to vent 774 by any suitable means. In at least one embodiment, a fan 787 is placed below vent 774. Fan 787 may be activated when directed by a controller, not shown.

Figure 10:
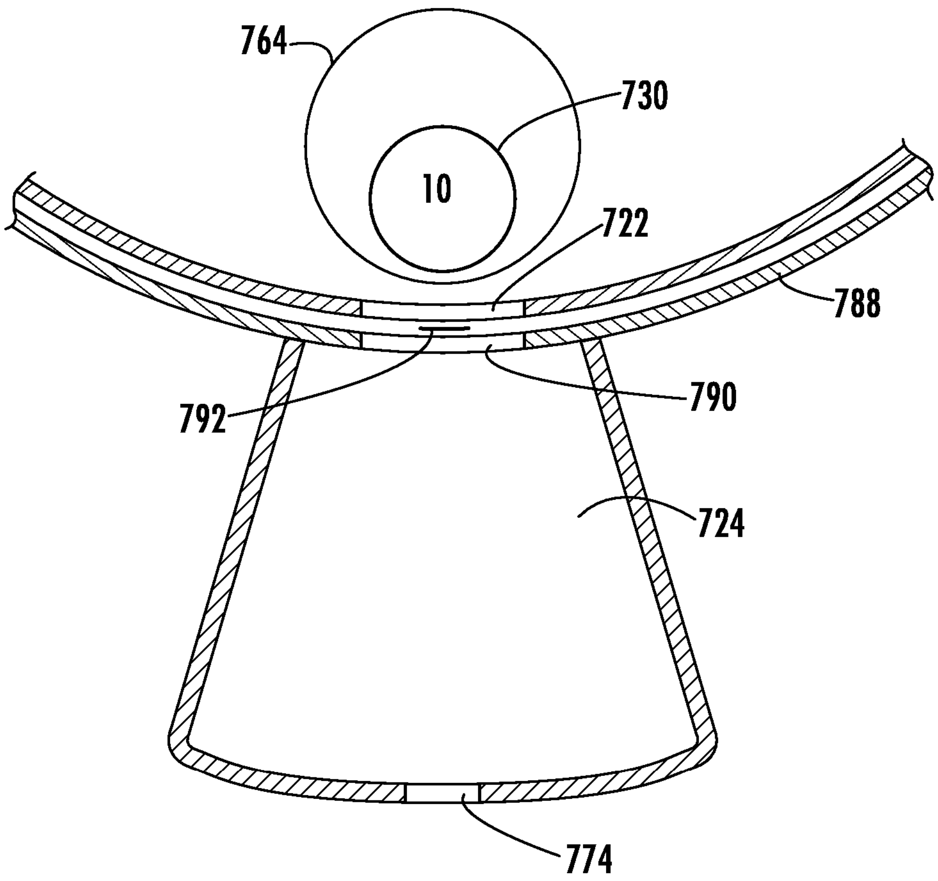
FIG. 10 is substantially a front perspective view of another embodiment of a prize display for an embodiment of the gaming device of FIG. 8.

FIG. 10 illustrated another possible embodiment of prize display 720. Again, prize display 720 may include a moveable object holder 726. In the illustrated embodiment, each moveable object 730 is held in a recess 764. Moveable objects 730 are normally maintained in their recesses through contact with barrier 788. At least one section of barrier 788 has an opening 790. A pin 792, or other blocking device may be used to prevent moveable objects 730 from passing through opening 790. When it is desired to allow a moveable object to pass into a compartment 724, pin 792 may be retracted in response to a signal sent by a controller (not shown). Once pin 792 is retracted, a moveable object 730 may pass though opening 772 in moveable object holder 726, through opening 790 in barrier 788, and into a compartment 724.

Figure 11:
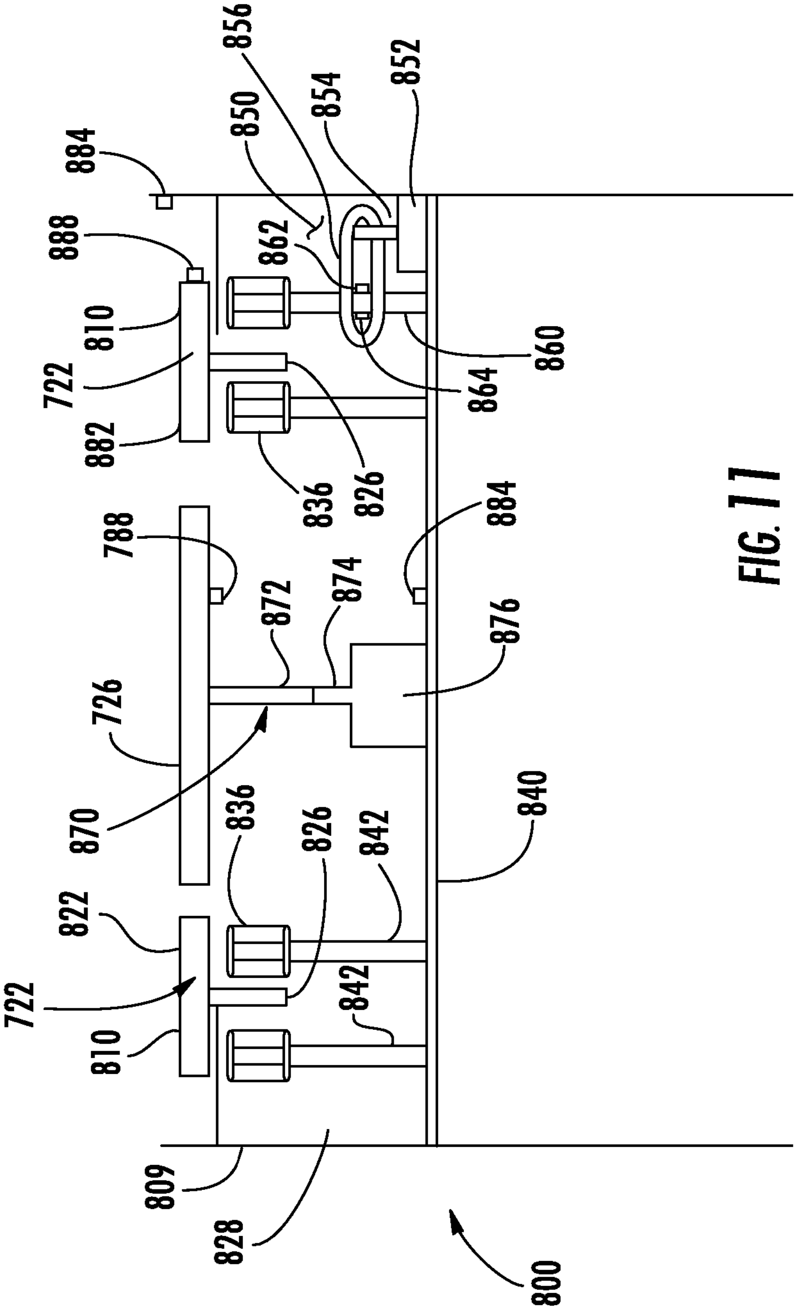
FIG. 11 is substantially a schematic diagram of one embodiment of an actuating device for a prize display of an embodiment of the gaming device of FIG. 8.

FIG. 11 depicts an embodiment 800 of an actuating mechanism for moveable display object 722 and moveable object holder 726. Moveable display object 722 is depicted as a ring 810 having an outer surface 822 and a flange 826 extending into the interior 828 of housing 809. A plurality of rollers 836 may abut flange 826 in order to secure ring 810 whole allowing ring 810 to rotate. Rollers 836 may be secured to a base 840 by rods 842 secured to base 840.

At least one roller 836 is in communication with a drive mechanism 850. Drive mechanism 850 may be any suitable drive mechanism. One possible drive mechanism 850 includes a motor 852 having a drive shaft 854. Motor 852 may be a stepper motor, servo motor, dc motor, and the like. A belt 856 may be attached to drive shaft 854. Belt 856 may also be connected to rod 860 which may have a drive ring 862 having a belt channel 864 formed therein for securely receiving belt 856.

A drive mechanism 870 may be provided for moving moveable object holder 726. Moveable object holder 726 may be attached to a rod 872. Rod 872 may be coupled to a drive shaft 874 extending from motor 876. Motor 876 may be a stepper motor, servo motor, dc motor, or the like.

One or more positioning systems may be provided for tracking the position of moveable display object 722 and/or moveable object holder 726. A variety of positioning systems may be used without departing from the scope of the present invention. Certain positioning systems may employ one or more sensor 884, which may be an optical sensor. Sensor 884 may be configured to detect transmitters, optical interrupts, reflective or absorbent paint, or other identifying characteristics of moveable object holder 726, these characteristics are generically represented as 888. The position of moveable object holder 726 or moveable display object 722 may also be determined if an indexing motor, such as a servo motor or stepper motor, is used.

Figure 12:
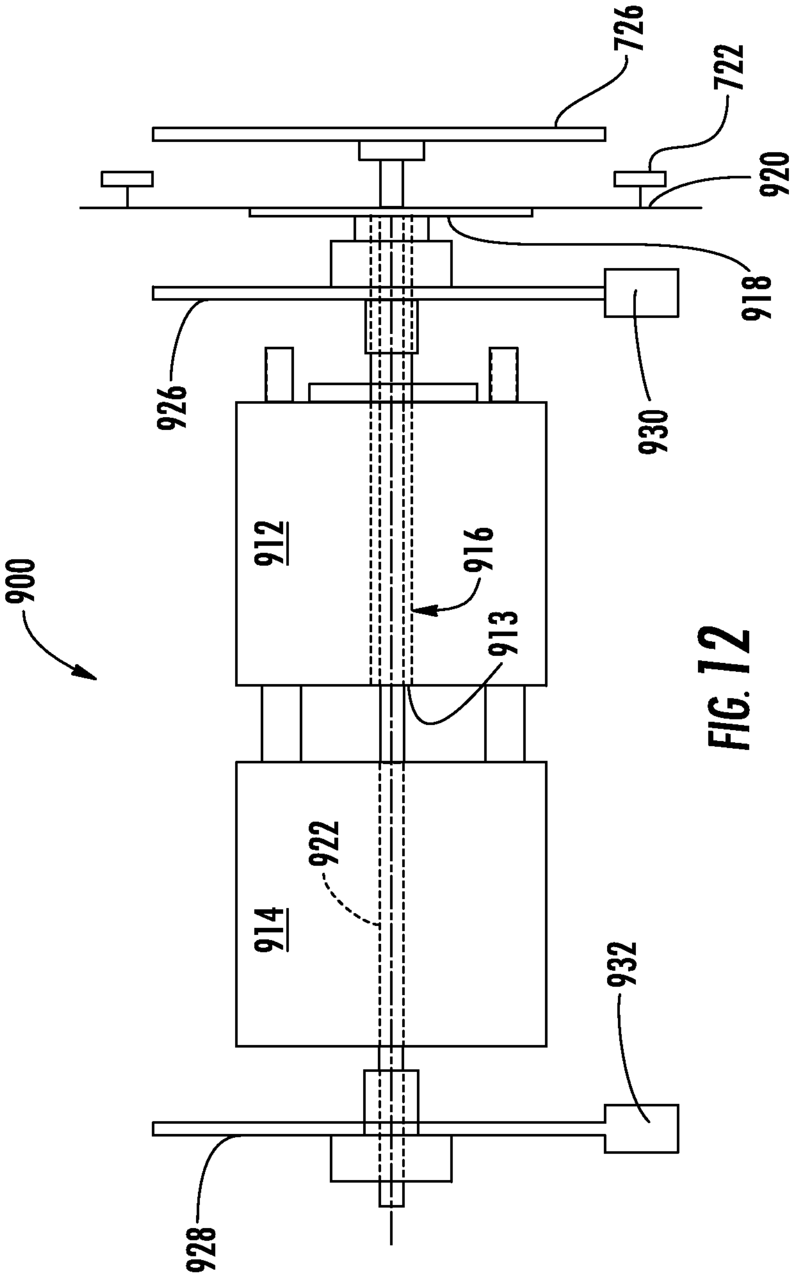
FIG. 12 is substantially a schematic diagram of an alternate embodiment of an actuating device for a prize display of an embodiment of the gaming device of FIG. 8.

FIG. 12 shows an alternate actuating mechanism for moveable display object 722 and moveable display object holder 726. In the illustrated embodiment, actuating mechanism 900 may have a first stepper motor 912 and a second stepper motor 914. First stepper motor 912 may have a tube 916 that attaches to an arm 918 having a plurality of support rods 920 that are coupled to moveable display object 722. Tube 916 may have a hollow center and may be positioned within a central bore 913 of first stepper motor 912.

Second stepper motor 914 may have a shaft 922, which passes through first stepper motor 912 in tube 916 and attaches to moveable object holder 726. Moveable object holder 726 and moveable display object 722 may be moved clockwise or counterclockwise and may operate independently of each other.

Actuating mechanism 900 may further have at least one positioning system. A portion of tube 916 opposite to the end attached to moveable display object 722 may be attached to first positioning system 926. A second positioning system 928 may be attached to the end of shaft 922 opposite to the shaft end attached to moveable object holder 726. First positioning system 926 and second positioning system 928 allow for tracking the position of shaft 922 and tube 916. First positioning system 926 and second positioning system 928 may have sensors 930 and 932 that detect rotation and transmit signals that can be used to determine the angular position of moveable display object 722 and moveable object holder 726. A controller (not shown in FIG. 12) may be in communication with actuating mechanism 900 to selectively position moveable display object 722 and moveable object holder 726.

Figure 13:
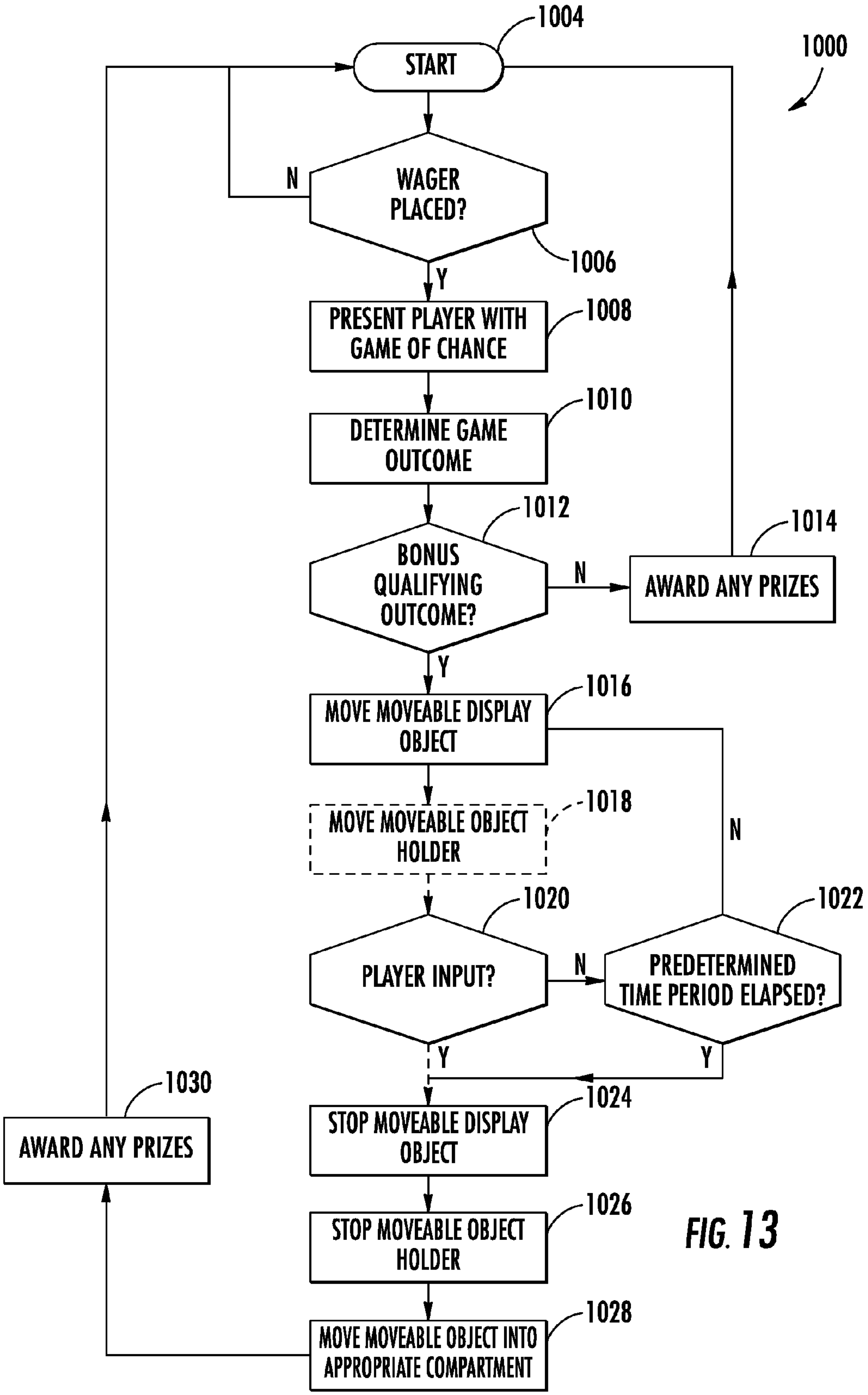
FIG. 13 is substantially a flowchart illustrating one embodiment of a gaming method using the gaming device of FIG. 8.

FIG. 13 presents a flowchart of gaming method 1000. Method 1000 starts at step 1004 and at decision 1006 determines whether a wager has been placed. If a wager has not been placed, method 1000 returns to step 1004. If a wager has been placed, method 1000 proceeds to step 1008 and presents a player with a game of chance and determines a game outcome at step 1010.

At decision 1012, it is determined whether the game outcome is a bonus qualifying outcome. If, at decision 1012, it is determined that the game outcome is not a bonus qualifying outcome, method 1000 proceeds to step 1014 and awards any prizes, if any, the player has won. Method 1000 then returns to step 1004.

If the game outcome is a bonus qualifying outcome, method 1000 proceeds to step 1016 and starts to move moveable display object 722. Optionally, at step 1018, moveable object holder 726 is moved.

At optional decision 1020, the player may be allowed to provide input through input device 760. If no player input is provided at decision 1020, method 1000 proceeds to decision 1022 to determine whether a predetermined time period has elapsed. If the predetermined time period has not elapsed, method 1000 returns to 1016 and continues to move moveable object holder 726 and moveable display object 722. At step 1024, movable display object 722 is stopped, according to the player input provided at decision 1020 or as determined by a controller. At step 1026, moveable object holder 726 is stopped according to the player input provided at decision 1020 or as determined by a controller. At step 1028, a moveable object 730 is moved from moveable object holder 726 into a compartment 724 of moveable display object 722 so that the game outcome is conveyed to the player. At step 1030 any bonus prizes won by the player are awarded to the player. Method 1000 then returns to step 1004.

Method 1000 is further illustrated by the following Example 1: A player places a wager of $0.50 on a gaming device; a primary game is presented to the player. The primary game randomly determines a game outcome that awards the player $10.00 and qualifies the player for a bonus game where the player will win $50. A moveable display object 722, appearing as a wheel with compartments 724 bearing prize amounts begins to spin. A moveable object holder 726, appearing as a wheel with a plurality of balls 730, each ball 730 bearing a multiplier, begins to spin.

A button 760 is made activatable; the player activates button 760 and moveable display object 722 stops with a base award of $10 being indicated. Moveable object holder 726 continues to spin for a predetermined time period, or until the player presses button 760. Moveable object holder 726 stops and a 5× multiplier is indicated by a ball bearing "5×" entering the compartment indicating a base award of $10. The player is awarded a $50 bonus prize, the product of the base award and the multiplier.

In certain embodiments, moveable display object 722 may be replaced by a display 720. Display 720 may have one or more display sections, or compartments, 724 adapted to receive a moveable object 730. Display 720 may be provided with one or more game related indicium 740 and/or visual elements 754. Game related indicium 740 may be characters, colors, symbols, or figures representing prizes such as credit amounts, dollar values, jackpot prizes, goods, services, multipliers and the like. In certain embodiments, each compartment 724 may be capable of displaying a plurality of game related indicia 740. In other embodiments, compartments 724 do not bear game related indicium 740, but contain various visual elements 754. Visual elements 754 may be different colored light, flashing lights, lights capable of various effects such as chasing each other, and the like. Visual elements 754 enhance the appearance of prize display 720, but do not convey a game outcome.

Figure 14:
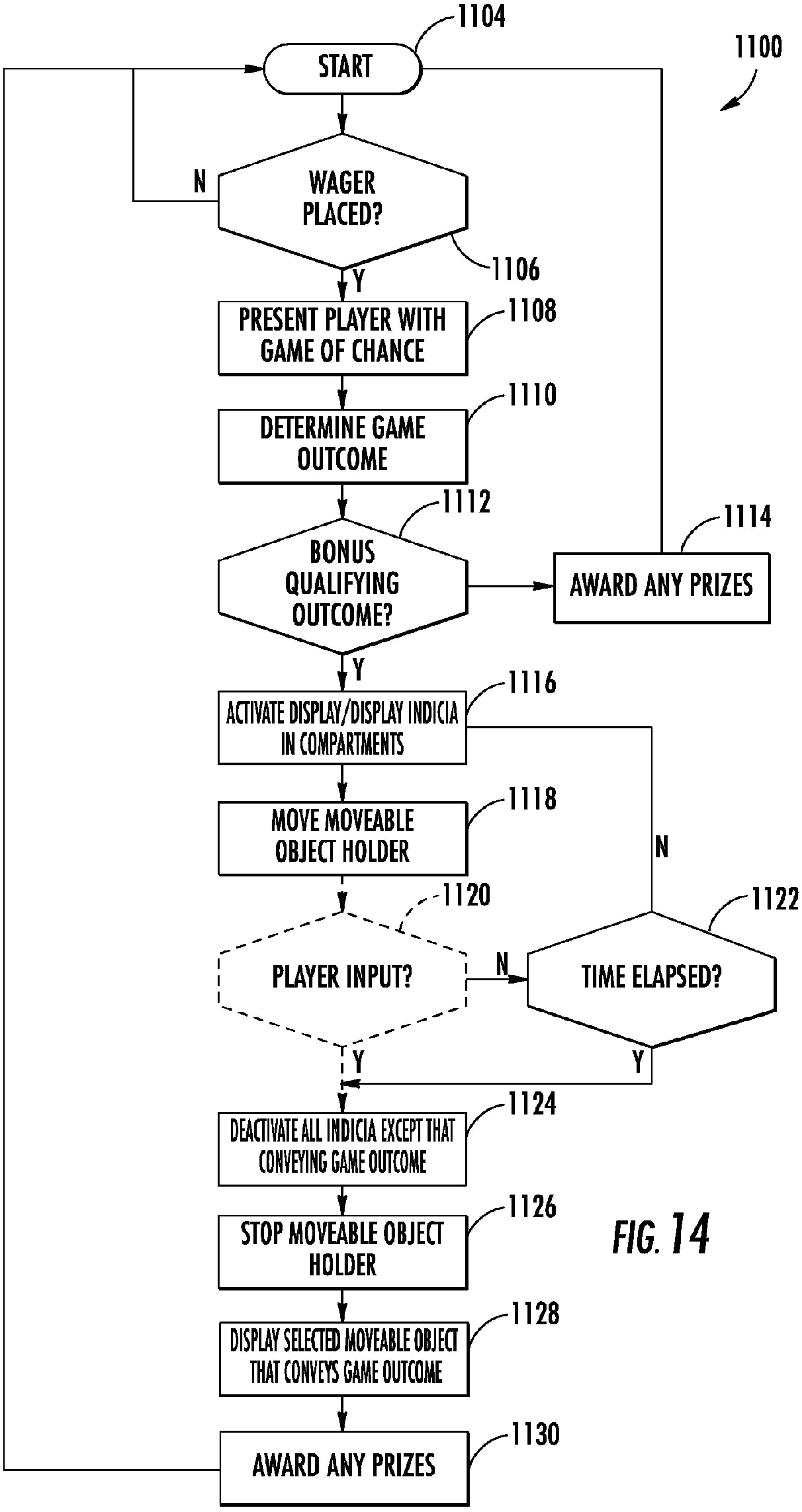
FIG. 14 is substantially a flowchart illustrating another embodiment of a gaming method using the gaming device of FIG. 8.

A method of operating this gaming apparatus is shown in FIG. 14. Method 1100 starts at step 1104 and decision 1106 checks to see if a player has placed a wager. If no wager has been placed, method 1100 returns to step 1104. If a wager has been placed, method 1100 proceeds to step 1108 and the player is presented with a game of chance. A game outcome is determined at step 1110. Decision 1112 checks to see if the game outcome is a bonus qualifying outcome. If the game outcome is not a bonus qualifying outcome, method 1100 proceeds to step 1114, awards any prizes to which the player is entitled, if any, and then returns to step 1104.

If decision 1112 determines that the game outcome is a bonus qualifying outcome, method 1100 proceeds to step 1116 and activates display 720, a plurality of indicia being displayed in compartments 724. Indicia 740 may displayed randomly, sequentially, or in other patterns. At step 1118, moveable object holder 726 is moved. Next, method 1100 may proceed to optional step 1120 and the player may be allowed to provide input through an input device 760, such as a lever, button, keyboard, touchscreen, or the like. At decision 1120, method 1100 checks to see if the player has provided player input. If no player input device has been provided at decision 1120, method 1100 checks to see if a predetermined time period has elapsed at decision 1122. If the predetermined time period has not elapsed, method 1100 returns to step 1116 and continues to display indicia 740 in compartments 724.

If decision 1120 indicates that the player has provided input, or decision 1122 indicates that the predetermined time period has elapsed, method 1100 proceeds to step 1124 where all indicators are deactivated except those conveying a game outcome. Moveable object holder is stopped at step 1126 and a moveable object that conveys the game outcome is displayed at step 1128. Any prizes to which the player is entitled are awarded at step 1130 and then method 1100 returns to step 1104. It can be seen that the timing between the player's input and the display of the game outcome may provide the player with the feeling that their input affected the game outcome. Of course, regulatory concerns may dictate that the game outcome be determined solely by random number generator.

Method 1100 is further illustrated by the following Example 2: A player places a wager of $0.25 on the game of chance and a primary game is presented to the player. The primary game awards the player with $20 and qualifies the player to play a bonus game where the player will be awarded a bonus prize of $100. A series of display sections 724 of display 720 are randomly illuminated, each display section 724 presents a base bonus prize amount which may vary each time a display section 724 is illuminated. Moveable object holder 726 begins to rotate, each moveable object 730 bears a multiplier value. Button 760 is made activatable. The player activates button 760 and a display section 724 showing a base prize amount of $50 is illuminated. A predetermined time passes without the player pressing button 760 again, moveable object holder 726 stops and moveable object 730 bearing a 2× multiplier is displayed. The player is awarded a bonus prize that is the product of the base prize and the multiplier, $100.

Figure 15:
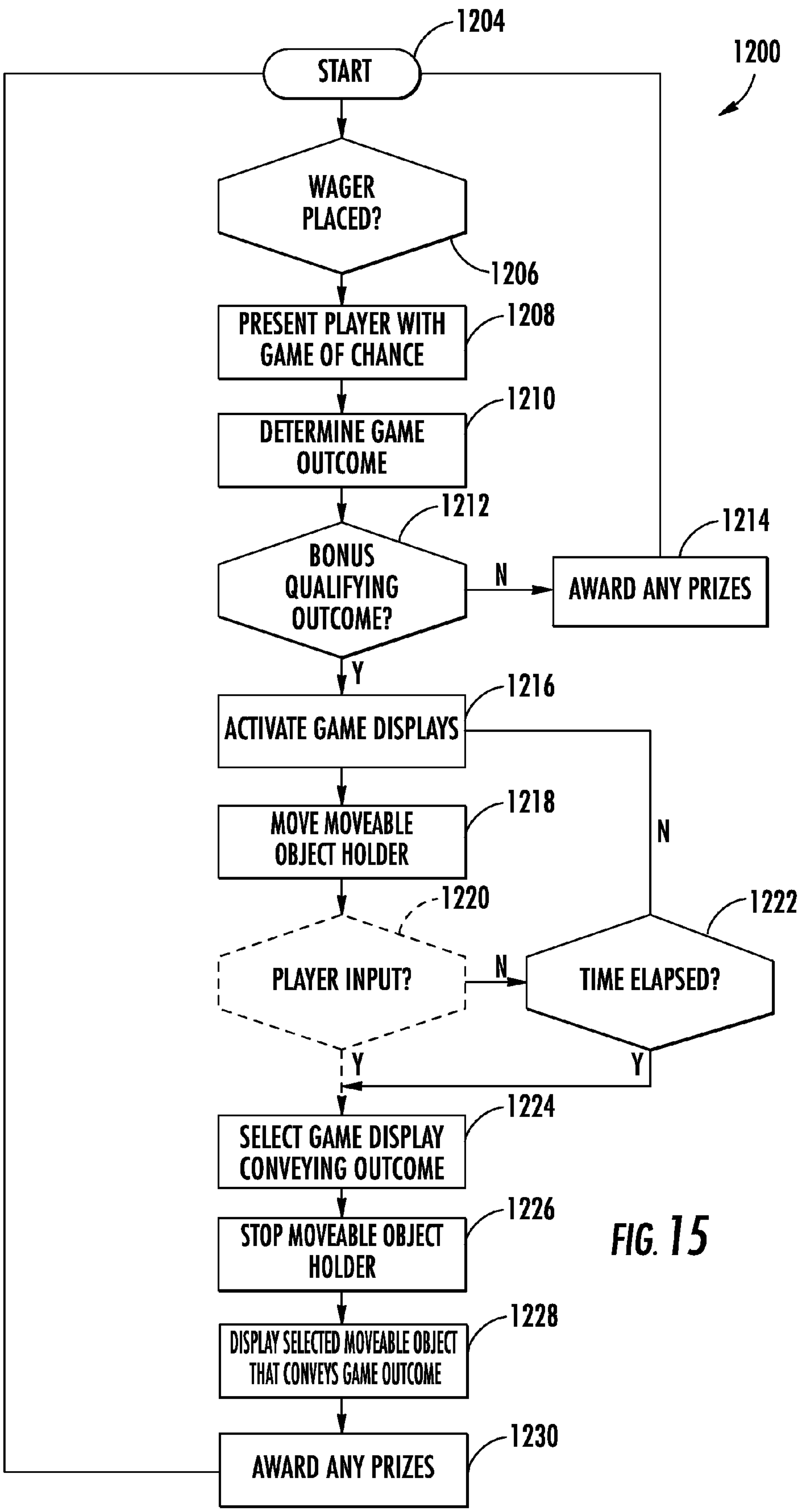
FIG. 15 is substantially a flowchart illustrating another embodiment of a gaming method using the gaming device of FIG. 8.

FIG. 15 illustrates a method 1200 where compartments, or game displays, 724 are not capable of displaying different indicia. Steps 1204-1214 are similar to steps 1104-1114. At step 1216, a plurality of game displays 724 are activated, each displaying a particular game indicia 740. Game displays 724 may be activated randomly, sequentially, or in patterns. At step 1218, moveable object holder 726 is moved.

At optional decision 1220, method 1200 checks to see if player input has been provided through a player input device 760, such as a lever, button, keyboard, touchscreen or the like. If decision 1220 determined that no input has been provided, method 1200 checks to see if a predetermined time period has elapsed at decision 1222. If the predetermined time period has not passed, method 1200 returns to step 1216.

If decision 1220 indicates that the player has provided input, or decision 1222 indicates that the predetermined time period has elapsed, method 1200 proceeds to step 1224 where all game displays 724 are deactivated except those conveying the game outcome. At step 1226 moveable object holder 726 is stopped and at step 1228 a selected moveable object that conveys the game outcome is displayed. At step 1230 the player is awarded any prizes to which the player is entitled and then method 1200 returns to step 1204. As with other embodiments, the player input may provide player with the illusion that they can affect the game outcome.

Method 1200 is further illustrated in the following Example 3: A player places a wager of $0.75 on the game of chance and primary game is presented to the player. The primary game awards the player with $50 and qualifies the player to play a bonus game where the player will be awarded a bonus prize of $10. A series of game displays of display 720 are sequentially illuminated, each display section 724 presents a specific base bonus prize amount. Moveable object holder 726 begins to rotate and each moveable object 730 bears a multiplier value; after a period of time, a game display 724 showing a base prize amount of $10 is illuminated. After a period of time, moveable object holder 726 stops and a moveable object 730 bearing a 1× multiplier is displayed. The player is awarded a bonus prize that is the product of the base prize and the multiplier, $10. Of course, the invention is not limited to the above described methods. For example, certain embodiments may use either moveable objects 730 or game displays, or compartments, 724 to display prize amounts or multiplier values. Additionally, moveable object holder 726 need not itself be moveable. Certain embodiments may use either moveable objects 730 or game displays, or compartments, 724 to display prize amounts or multiplier values. Additionally, moveable object holder 726 need not itself be moveable.

Figure 16:
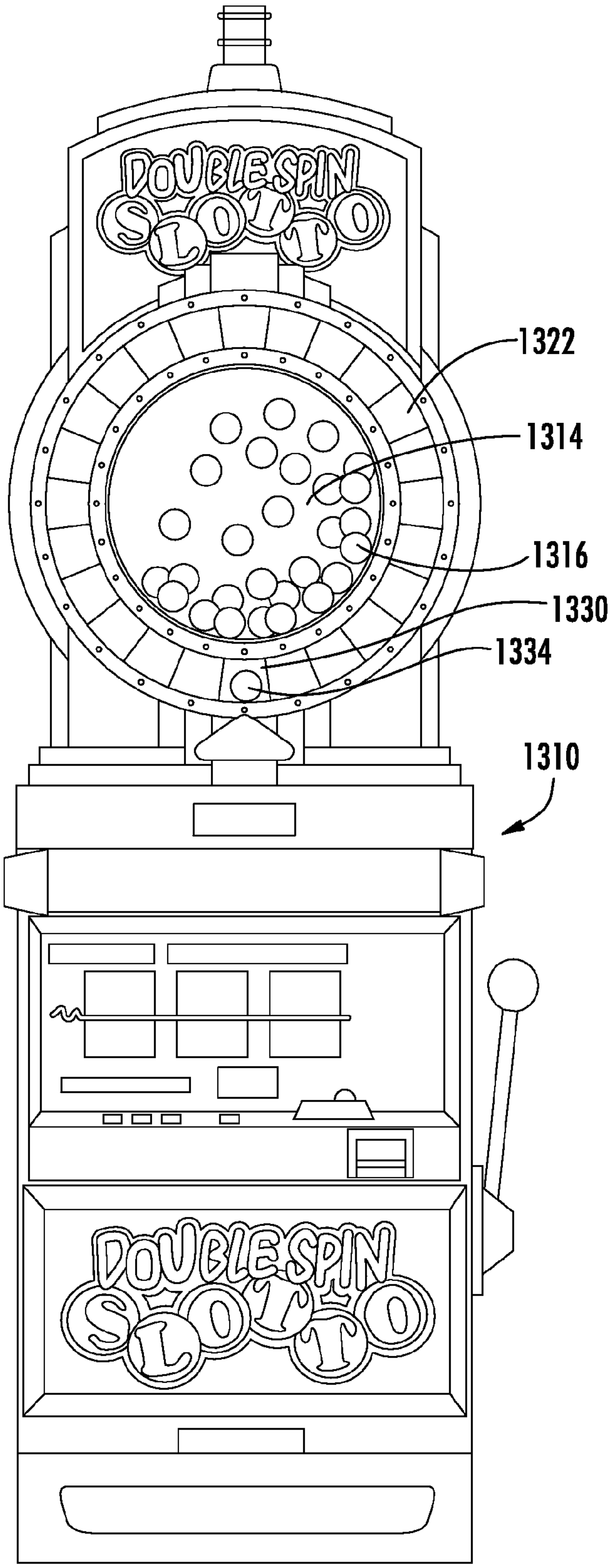
FIG. 16 is substantially a front elevational view of an alternate embodiment of a gaming apparatus of the present invention

FIG. 16 presents an alternative gaming apparatus 1310. Gaming apparatus 1310 has a jumbled ball display 1314 filled with a plurality of moveable objects 1316. Gaming apparatus 1310 may have a display window 1330 for displaying a prize object 1334 to the player. Display window 1330 may be part of a prize object display mechanism such have been previously described, including components illustrated in FIGS. 1A, 1B, 2A, and 2C-7. Prize objects 1334 may be appear at least similar to moveable objects 1316, providing the illusion that a prize object 1334 displayed in display window 1330 has been selected from the moveable objects 1316 within jumbled ball display 1314. Gaming apparatus 1310 may have a display object 1322. Display object 1322 may be fixed or moveable. Although display object 1322 is illustrated as a wheel, display object 1322 may be any suitable shape or representation. Gaming apparatus 1310 may be operated in a manner similar to the methods disclosed in FIGS. 8-15.

Figure 17:
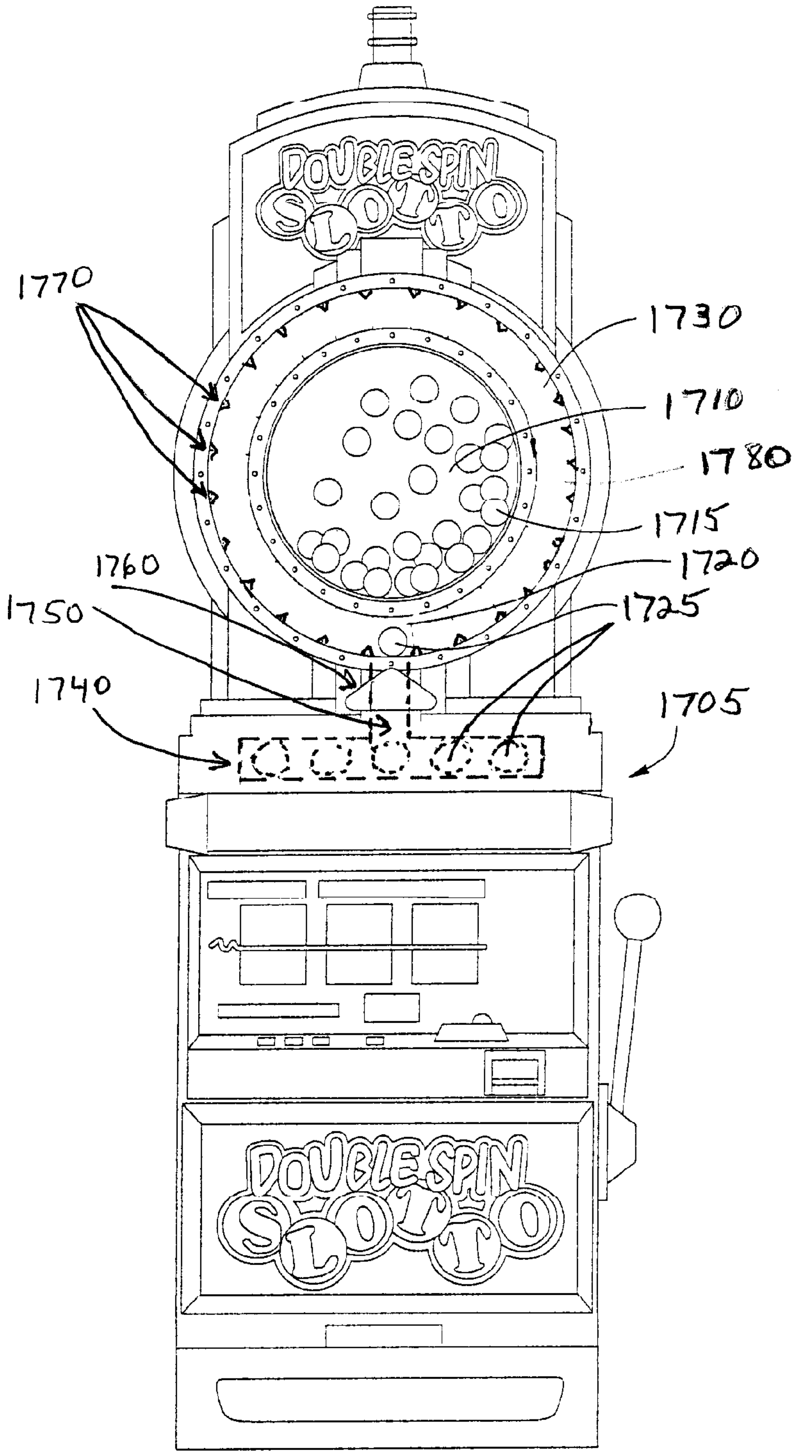
FIG. 17 is substantially a front elevational view of another embodiment of a gaming apparatus of the present invention.

FIG. 17 illustrates a gaming apparatus 1705 according to the present invention. Gaming apparatus 1705 has a jumbled ball display 1710 involving a container filled with a plurality of moveable objects 1715. Moveable objects 1715 may be moved or agitated in the container as previously described regarding FIG. 1. Gaming apparatus 1705 includes a display position 1720 for presenting and indicating a selected prize object 1725. Display position indicator 1760 (pointer) may further identify and indicate the selected prize object 1725 to the player. Gaming apparatus 1705 also includes rotatable display element 1730 (shown here in the shape of a doughnut-type wheel) having a cavity containing a plurality of barrier elements 1770. The spacing between any two barrier elements 1770 corresponds to one of the display segments 1780.

Rotatable display element 1730 may be in the form of any toroid-shaped (doughnut-shaped) element without any barrier elements located therein; in this case, the cavity of the rotatable display element is defined by the space between the outer perimeter and the center hole of the toroid. Rotatable display element 1730 may also be represented by a cylindrical-shaped element where the entire center portion of the cylinder represents the cavity of the rotatable display element.

Barrier elements 1770 may be selected from a variety of structures that allow free movement of prize objects 1725 disposed within rotatable display element 1730, that is, barrier elements 1770 may at least partially impede movement of prize objects 1725 in the annular portion of rotatable display element 1730 without capturing or fixedly restraining prize object 1725. Barrier elements 1770 may be selected from one or more of the group consisting of raised nubs, bumps and irregularities along the outer perimeter of rotatable display element 1730.

Gaming apparatus 1705 further includes prize object holder 1740 (which is shown as being hidden from view of the player in this embodiment). Prize object holder 1740 may be any of the types of holders previously described and shown in FIGS. 2A, 2C and 3-7. Prize objects 1725 that are held in prize object holder 1740 may be transferred from prize object holder 1740 to rotatable display element 1730 via prize object transfer shaft 1750. Various positioning mechanisms (not shown), similar to those described and shown in FIGS. 2A and 5B, configured to transfer the selected prize object 1725 to rotatable display element 1730, may be used.

Figure 18:
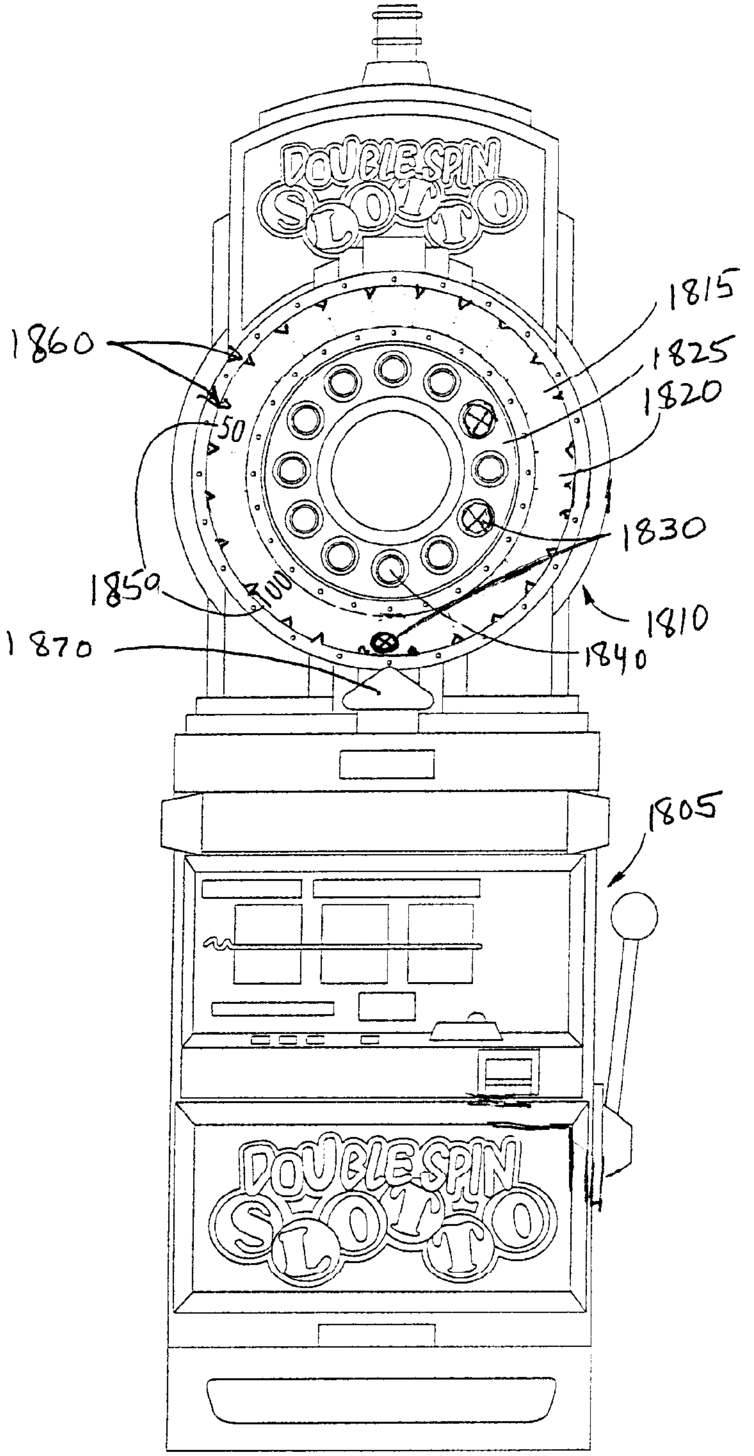
FIG. 18 is substantially a front elevational view of another embodiment of a gaming apparatus of the present invention

FIG. 18 illustrates another gaming apparatus 1805 according to the present invention. Gaming apparatus 1805 includes prize display 1810 which comprises rotatable display element 1815 (shown here in the shape of a doughnut-type wheel) and prize object holder 1825. Rotatable display element 1815 and prize object holder 1825 are shown here as being arranged in a concentric relationship to each other; in this case, prize object holder 1825 is at least partially circular and is located adjacent to display segments 1820 of rotatable display element 1815. Display segments 1820 are located in the cavity of rotatable display element 1815 and may be defined similarly to display segments 1780 (of FIG. 17) in relationship to barrier elements 1860. Rotatable display element 1815 (as well as rotatable display element 1730 of FIG. 17) may be moved using actuating mechanisms (see discussion regarding FIGS. 11 and 12) similar to those described to provide movement for moveable display object 722 of FIG. 8.

Prize objects 1830 are held in chambers 1840 of prize object holder 1825 and are moved from prize object holder 1825 to rotatable display element 1815 during game play. Transfer of prize objects 1830 to rotatable display element 1815 may be by gravity or caused by any mechanisms previously described for movement and transfer of balls to and from ball holders associated with FIGS. 2A, 2C and 3-7.

Typical gaming activity may include movement (rotation) of prize object holder 1825 to attract attention and entertain a player during game play. The prize object holder may be moved by mechanisms (such as a stepper motor, for example) similar to those previously described for moving ball holder 58 (see discussion regarding FIGS. 2A, 6 and 7). The game outcome may then be presented to the player by stopping movement of prize object holder 1825 and causing the prize object to enter rotatable display element 1815, where the combination of the selected prize object 1830 and the particular display segment 1820 of rotatable display element 1815 receiving the selected prize object 1830 conveys the game outcome. Gaming apparatus 1805 includes a display position indicator 1870 for presenting and indicating a selected prize object 1830 to the player, in this case corresponding to the lowest rest position of rotatable display element 1815. Game related indicia 1850 may be located in various display segments 1820 of rotatable display segment 1815 to further convey the game outcome. The selected prize object positioned in rotatable display element 1815 may be returned to prize object holder by any of the transfer or positioning mechanisms described for the ball holders described in FIGS. 2A, 2C and 3-7.

Display segments 1780 (FIG. 17) and 1820 (FIG. 18) may be configured to be activatable by a controller (not shown) to display a plurality of game related indicia. The game related indicia may convey game related information associated with possible prizes as well as non-prize information. The activatable display segments may further use various display modes to provide the game related information, for example, light-emitting diode (LED) displays, cathode-ray tube (CRT) displays, liquid-crystal displays (LCD), and incandescent lighting displays. Alternatively, game related indicia (and information) may also be displayed on prize objects 1725 and 1830 to at least partially provide and convey the game outcome to the player.

Figure 19:
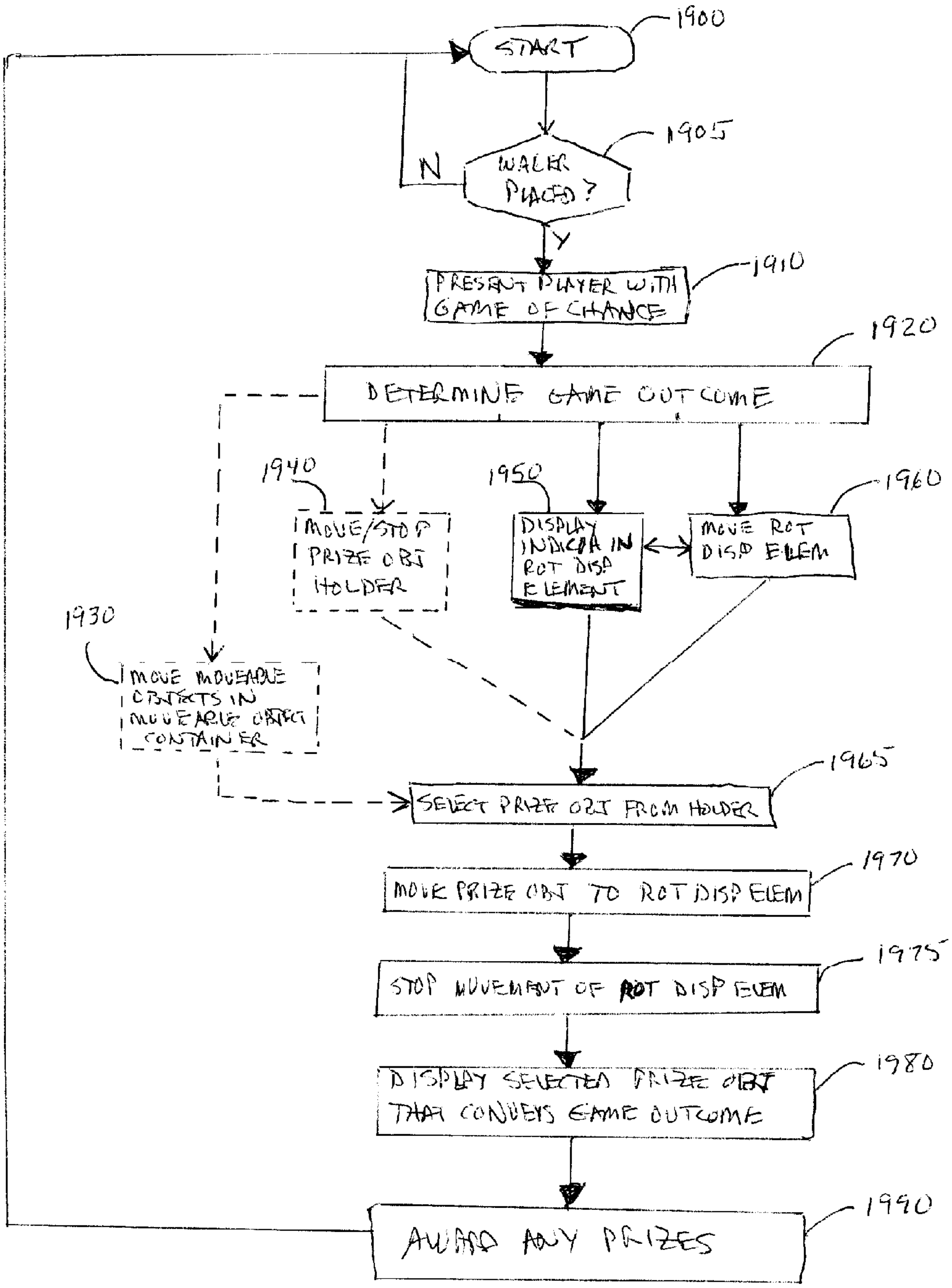
FIG. 19 is substantially a flowchart illustrating embodiments of a gaming method using the gaming device of FIGS. 17 and 18.

FIG. 19 presents a flowchart representing several methods of operation of the gaming apparatus shown in FIGS. 17 and 18. The overall method starts at step 1900 and at decision 1905 determines whether a wager has been placed. If a wager has not been placed, the method returns to step 1900. If a wager has been placed, the method proceeds to step 1910 and presents a player with a game of chance and determines a game outcome at step 1920.

Optionally, at step 1940, the prize object holder may be moved (for example, rotated), for example, prize object holder 1825 shown in FIG. 18. At step 1960, the rotatable display element (1730 and 1815 of FIGS. 17 and 18, respectively) is moved (rotated). At step 1950, game related indicia are shown in the rotatable display element to partially convey the game outcome to the player.

At step 1965, a prize object (1725 and 1830 of FIGS. 17 and 18, respectively) is selected from the prize object holder (1740 and 1825 of FIGS. 17 and 18, respectively) and moved (step 1970) to the rotatable display element. If the prize object holder was being moved in optional step 1940, it is stopped at this point to allow transfer of the prize object to the rotatable display element.

In another optional embodiment, moveable objects may be provided and moved or agitated in a moveable object container (for example, as shown by 1710 and 1715 in FIG. 17) at step 1930. Optional step 1930 may be included when the prize object holder 1740 is hidden from view of the player (as indicated in FIG. 17) in order to provide the illusion that the prize object selected for display in the rotatable display element has been selected from the moveable objects within the moveable object container.

At step 1975, movement of the rotatable display element is stopped. Prior to stopping the rotatable display element, the selected prize object is allowed to move freely within the rotatable display element to provide an atmosphere of uncertainty as where the prize object will finally settle when movement of the rotatable display element is terminated and the selected prize object comes to rest. The optional use of barrier elements in the rotatable display element, which partially impedes movement of the prize object, allows for irregular movement of the selected prize object while the rotatable display element is still moving and contributes to the attraction feature of the prize display.

At step 1980, the selected prize object is displayed at rest in the rotatable display element. The combination of the selected prize object and the particular display segment receiving the selected prize object conveys the game outcome. Any prizes to which the player is entitled are awarded at step 1990 and then the method returns to step 1900.

Accordingly, the present invention provides a gaming device including at least one prize object that may be positioned within a prize object holder and moveable to a rotatable display element. The prize object holder may also be moveable. Gaming devices according to the present invention may provide exciting and attractive game displays to game players and may provide a number of game play possibilities for game designers.

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

We claim:

1. A gaming apparatus comprising:

a gaming device configured to allow a player to place a wager and play a game of chance having a randomly determined game outcome;

a display area comprising:

a first mechanical display area including an object container having a plurality of three-dimensional non-prize objects therein, wherein the first mechanical display area is visible to the player;

a prize object holder configured to hold a plurality of three-dimensional prize objects in an individually controlled manner, wherein the plurality of three-dimensional prize objects are hidden from view from the player while in the prize object holder;

a second mechanical display area including a rotatable display element comprising a cavity to receive at least one of the plurality of three-dimensional prize objects; and a positioning mechanism configured to transfer a selected three-dimensional prize object from the prize object holder to the rotatable display element; and a controller in communication with the gaming device and the positioning mechanism, wherein the controller is configured to cause the positioning mechanism to transfer the selected three-dimensional prize object from the prize object holder to the rotatable display element, wherein the plurality of three-dimensional non-prize objects have a similar appearance to the plurality of three-dimensional prize objects.

2. The gaming apparatus of claim 1 wherein the cavity of the rotatable display element comprises a plurality of barrier elements configured to partially impede movement of the selected prize object disposed within the rotatable display element.

3. The gaming apparatus of claim 1 wherein the rotatable display element further comprises a plurality of display segments.

4. The gaming apparatus of claim 3 wherein each display segment is defined by spacing between any two consecutive barrier elements.

5. The gaming apparatus of claim 3 wherein each of the plurality of display segments is configured to be activatable by the controller to display a plurality of game related indicia.

6. The gaming apparatus of claim 3 wherein the prize object holder is at least partially circular and the display segments of the rotatable display element are located adjacent to a circular portion of the prize object holder.

7. The gaming apparatus of claim 6 wherein the prize object holder and the rotatable display element are arranged in a concentric relationship to each other.

8. The gaming apparatus of claim 3 wherein the controller is configured to select one of the plurality of display segments of the rotatable display element in order to at least partially convey the game outcome.

9. The gaming apparatus of claim 8 wherein the game outcome is conveyed when the selected prize object comes to rest in one of the plurality of display segments of the rotatable display element after movement of the rotatable display element is terminated.

10. The gaming apparatus of claim 1, wherein the first mechanical display area is a jumbled ball display.

11. The gaming apparatus of claim 1, wherein the similar appearance is configured to provide an illusion that the prize object selected for display in the rotatable display element has been selected from the moveable objects within the moveable object container.

12. The gaming apparatus of claim 1 wherein the rotatable display element comprises a shape selected from the group consisting of toroid and cylindrical forms.

13. A gaming method for use by a gaming device having a processor, comprising:

allowing a player to place a wager on a game of chance;

presenting the player with the game of chance;

determining a game outcome;

displaying, to the player, a plurality of three-dimensional non-prize objects in an object container;

displaying at least one game related indicium in a rotatable display element;

releasably holding a plurality of three-dimensional prize objects in an individually controlled manner in a prize object holder, wherein the plurality of three-dimensional prize objects are hidden from view of the player while in the prize object holder, wherein the plurality of three-dimensional non-prize objects have a similar appearance to the plurality of three-dimensional prize objects;

moving a selected three-dimensional prize object from the prize object holder to the rotatable display element such that the selected three-dimensional prize object is displayed to the player; and allowing the selected three-dimensional prize object to move freely within the rotatable display element during movement of the rotatable display element.

14. The gaming method of claim 13 further comprising locating a plurality of display segments in the rotatable display element.

15. The gaming method of claim 14 further comprising selecting one of the display segments that at least partially conveys the game outcome to the player.

16. The gaming method of claim 14 further comprising providing a plurality of barrier elements configured to partially impede movement of the selected prize object in the rotatable display element and defining each display segment by spacing between any two consecutive barrier elements.

17. The gaming method of claim 13 further comprising moving a plurality of moveable objects in a moveable object container.

18. The gaming method of claim 17 further comprising providing an illusion that the selected prize object in the rotatable display element has been selected from the plurality of moveable objects.

19. The gaming method of claim 13 further comprising moving the prize object holder.

20. The gaming method of claim 19 further comprising locating a plurality of display segments in the rotatable display element, stopping the prize object holder and causing the selected prize object to enter into a display segment of the rotatable display element, wherein combination of the selected prize object and the display segment receiving the selected prize object conveys the game outcome.

21. The gaming method of claim 20 further comprising allowing the player to provide input using a player input device, the player input at least apparently allowing the player to influence movement of the prize object holder.

22. The gaming method of claim 13 further comprising moving the rotatable display element.

23. The gaming method of claim 22 further comprising allowing the player to provide input using a player input device, the player input at least apparently allowing the player to affect movement of the rotatable display element.

24. The gaming method of claim 13 further comprising moving the rotatable display element and stopping the rotatable display element so the game related indicium may convey the game outcome.

25. The gaming method of claim 13 further comprising allowing the player to provide input using a player input device, the player input at least apparently allowing the player to affect the game outcome.

26. The gaming method of claim 13 wherein determining the game outcome comprises providing a bonus qualifying event.

* * * * *